United States Patent [19]
Mahalingaiah et al.

[11] Patent Number: 5,564,060
[45] Date of Patent: Oct. 8, 1996

[54] INTERRUPT HANDLING MECHANISM TO PREVENT SPURIOUS INTERRUPTS IN A SYMMETRICAL MULTIPROCESSING SYSTEM

[75] Inventors: Rupaka Mahalingaiah; Rodney Schmidt, both of Austin, Tex.

[73] Assignee: Advanced Micro Devices, Sunnyvale, Calif.

[21] Appl. No.: 251,849

[22] Filed: May 31, 1994

[51] Int. Cl.⁶ .................................................. G06F 9/00
[52] U.S. Cl. ........................ 395/871; 395/733; 395/550; 395/737; 364/DIG. 1; 364/271.6; 364/271.7; 364/DIG. 2; 364/950; 364/950.2
[58] Field of Search ................................. 395/500, 375, 395/741, 733, 737, 871, 868, 800, 550

[56] References Cited

U.S. PATENT DOCUMENTS

| 5,237,674 | 4/1987 | Mohme et al. | 395/425 |
|---|---|---|---|
| 5,367,689 | 11/1994 | Mayer et al. | 395/725 |
| 5,446,910 | 8/1995 | Kennedy et al. | 395/800 |
| 5,455,916 | 10/1995 | Bourke et al. | 395/285 |
| 5,495,615 | 2/1996 | Nizar et al. | 395/733 |

OTHER PUBLICATIONS

Intel, "MultiProcessor Specification", Version 1.1 (Apr. 1994).

Primary Examiner—Larry D. Donaghue
Attorney, Agent, or Firm—B. Noel Kivlin

[57] ABSTRACT

A symmetrical multiprocessing system is provided that includes centralized interrupt control unit. The interrupt control unit is coupled to a plurality of processing units and to a plurality of interrupt sources. The interrupt control unit advantageously allows for the expansion of each interrupt pin by setting the interrupt control unit in a cascade mode. Furthermore, the central control unit is responsive to specialized interrupt cycles which allows I/O devices and/or bus bridge devices to initiate of an interrupt without requiring a dedicated interrupt line. The central interrupt control unit further allows each interrupt to be prioritized independently of its associated vector ID, and prevents the occurrence of spurious interrupts by providing a programmable latency timer which causes the central interrupt control unit to delay its response to End Of Interrupt (EOI) instructions. An auto-chaining technique is further implemented by the central interrupt control unit to sequentially provide broadcast interrupts to various processing units based on their current task priority values. Finally, the central interrupt control unit further handles system management interrupts (SMIs) from sources such as power management units and ensures proper system operation even if the requested system management function affects operations being carried by other processing units.

7 Claims, 22 Drawing Sheets

Interrupt Channel Control Register

INTERRUPT HANDLING MECHANISM TO PREVENT SPURIOUS INTERRUPTS IN A SYMMETRICAL MULTIPROCESSING SYSTEM

BACKGROUND OF THE INVENTION

1. Field of the Invention

This invention relates to computer systems and more particularly to interrupt control architectures and schemes employed within symmetrical multiprocessing systems.

2. Description of the Relevant Art

Computer systems employing multiple processing units hold a promise of economically accommodating performance capabilities that surpass those of current single-processor based systems. Within a multiprocessing environment, rather than concentrating all the processing for an application in a single processor, tasks are divided into groups or "threads" that can be handled by separate processors. The overall processing load is thereby distributed among several processors, and the distributed tasks may be executed simultaneously in parallel. The operating system software divides various portions of the program code into the separately executable threads, and typically assigns a priority level to each thread.

FIG. 1 is a block diagram of a so-called symmetrical multiprocessing system 10 including a plurality of processing units 12A–12C. Each processing unit 12A–12C includes a processing core 14A–14C, a cache memory 16A–16C, and a bus interface 18A–18C, respectively. The processing units 12A–12C are coupled to a main memory 20 via a system bus 22. A pair of I/O devices 24 and 26 are further coupled to system bus 22.

The multiprocessing system 10 of FIG. 1 is symmetrical in the sense that all processing units 12A–12C share the same memory space (i.e., main memory 20) and access the memory space using the same address mapping. The multiprocessing system 10 is further symmetrical in the sense that all processing units 12A–12C share equal access to the same I/O subsystem.

In general, a single copy of the operating system software as well as a single copy of each user application file is stored within main memory 20. Each processing unit 12A–12C executes from these single copies of the operating system and user application files. Although processing cores 14A–14C may be executing code simultaneously, it is noted that only one of the processing units 12A–12C may assume mastership of the system bus 22 at a given time. Thus, a bus arbitration mechanism (not shown) is provided to arbitrate concurrent bus requests of two or more processing units and to grant mastership to one of the processing units based on a predetermined arbitration algorithm. A variety of bus arbitration techniques are well-known.

The high speed cache memory 16A–16C of each processing unit 12A–12C, respectively, stores data most recently accessed by the respective processing unit along with address tags that indicate the main memory address to which the associated data corresponds. Since programs tend to execute the same sections of code and access the same data structures repeatedly, many of the locations accessed will already be stored in the cache if the cache is sufficiently large.

The cache mechanisms provide two significant benefits. First, because the caches are implemented with high-speed memory and can be accessed without bus arbitration and buffer delays, an access to a location stored in a respective cache is much faster than a main memory access. Second, because an access to a location stored in the respective cache does not require access to the system bus, the bus utilization of each processor is greatly reduced. The system bus is therefore available to service other requested transactions. Typically, the higher the "hit rate", the better the overall system performance. The hit rate is the percentage of accesses by a particular processing core that are to locations already stored in the cache. Well designed systems with moderately large caches can achieve hit rates of over ninety percent.

An important consideration with respect to multiprocessing systems that employ cache memories is data coherency. Since multiple copies of the data (and instructions) stored by main memory 20 may concurrently reside in one or more of the cache memories 16A–16C, a specialized mechanism must be employed to maintain the integrity of data in the event that one of the memory subsystems is updated (i.e., written with new data). For example, consider a situation wherein a particular section of data is updated within cache memory 16A by processing core 14A but is not updated within the corresponding section of main memory 20. If processing core 14B subsequently accesses the same section of code, there must be some reliable mechanism to track which section is up-to-date and which section is no longer valid to ensure that processing core 14B accesses the proper data. A variety of techniques have therefore been developed with the goal of efficiently maintaining cache coherency, including those based on so-called write-through and write-back techniques. Various cache coherency techniques are described within a host of publications of the known prior art, and are not discussed further herein.

Another important consideration with respect to symmetrical multiprocessing systems is the handling and distribution of interrupts generated by various system resources. For example, in the system of FIG. 1, I/O devices 24 and 26 may each assert a respective interrupt signal based on the occurrence (or non-occurrence) of a particular event. As will be appreciated by those of skill in the art, interrupts are routinely generated by system resources such as keyboard devices, printers, and timers, among other things. Many systems also accommodate software interrupts whereby an interrupt may be asserted in response to software command. Due to the number of different interrupts that may occur within a system, it is desirable to provide a mechanism to efficiently manage and distribute the interrupts to achieve optimal system performance and bus utilization.

One technique for handling interrupts employs a centralized interrupt controller that is capable of receiving a plurality of interrupts and of prioritizing and distributing the interrupts amongst the various processing units. A problem associated with a centralized interrupt control technique is that the total number of interrupts which can be accommodated is typically limited by the number of input pins provided to the centralized interrupt controller. In other words, for example, if the centralized interrupt controller includes a total of sixteen interrupt input pins, greater than sixteen interrupt generating devices typically cannot be accommodated within the system. This limits system flexibility. Furthermore, within such systems a dedicated interrupt line must be connected to each interrupt source. Such dedicated interrupt lines may not be available on remote cabling networks that connect one or more peripherals to the computer system. Again, system flexibility may consequently be limited.

Another problem which may be encountered with respect to interrupt management within symmetrical multiprocessing systems is the occurrence of invalid or "spurious" interrupts. As is generally known, when a level triggered interrupt is being serviced by a designated processing unit, an I/O command is typically associated with the interrupt service routine that, where executed, causes the interrupt source to deassert the interrupt signal. Subsequently, an End Of Interrupt (EOI) command is executed to inform the interrupt controller that the interrupt service has completed. A spurious interrupt may occur if a significant latency is introduced between the time at which the processing unit executes the I/O command (to cause the interrupt source to deassert the interrupt signal) and the time at which the interrupt signal is actually deasserted. Such a latency may occur, for example, if the I/O device resides on a remote bus via several bus bridge units. If the interrupt source does not deassert the interrupt signal before the centralized interrupt controller responds to the End Of Interrupt command, the continued assertion of the interrupt may be detected by the interrupt controller, thus causing the interrupt to unintentionally re-initiate.

The management of timer tick interrupts poses another problem within symmetrical multiprocessing systems. As is generally known, in a multiprocessing system there are some interrupts which need to be handled by all processing units in a broadcast fashion. For example, many multiprocessing systems use the timer tick interrupt to signal the end of a time slice and to thus cause each processing unit to execute a task switch. This is typically accomplished by either simultaneously sending the timer tick interrupt to all processing units or by sending the timer tick interrupt to the first processing unit in the chain and passing it to the others via interprocessor interrupts (IPIs). However, there are drawbacks to both of these schemes. If all processing units are interrupted at the same time, they will attempt to access the same shared interrupt handler code and will lock shared system resources at the same time. This may cause a great deal of contention and may require some processing units to wait until the required resources become available. If the timer tick interrupt is provided to the first processing unit in the chain and is passed to the others by using interprocessor interrupts, increased software overhead and bus utilization is incurred.

Still additional problems related to interrupt management within symmetrical multiprocessing systems include the integration of system management interrupts (SMI) and the prioritization of interrupts. It is desirable to provide mechanisms within symmetrical multiprocessing systems that allow both efficient integration of SMI interrupts within the system as well as flexible interrupt prioritization.

SUMMARY OF THE INVENTION

The problems outlined above are in large part solved by a symmetrical multiprocessing system in accordance with the present invention. In one embodiment, a symmetrical multiprocessing system is provided that includes centralized interrupt control unit. The interrupt control unit is coupled to a plurality of processing units and to a plurality of interrupt sources. The interrupt control unit advantageously allows for the expansion of each interrupt pin by setting the interrupt control unit in a cascade mode. Furthermore, the central control unit is responsive to specialized interrupt cycles which allows I/O devices and/or bus bridge devices to initiate an interrupt without requiring a dedicated interrupt line. The central interrupt control unit further allows each interrupt to be prioritized independently of its associated vector ID, and prevents the occurrence of spurious interrupts by providing a programmable latency timer which causes the central interrupt control unit to delay its response to End Of Interrupt (EOI) instructions. An auto-chaining technique is further implemented by the central interrupt control unit to sequentially provide broadcast interrupts to various processing units based on their current task priority values. Finally, the central interrupt control unit further handles system management interrupts (SMIs) from sources such as power management units and ensures proper system operation even if the requested system management function affects operations being carried on by other processing units.

Broadly speaking, the present invention contemplates an interrupt controller comprising a plurality of interrupt input terminals, a central controller coupled to the input terminals for prioritizing the interrupt signals and for providing the interrupt signals to at least one processing unit, and a status register coupled to the central controller for storing information indicative of whether a particular interrupt signal is idle, wherein the central controller controls the status of the status register according to interrupt signals dispatched to the processing unit and an End Of Interrupt command executed by the processing unit. The interrupt controller further comprises a programmable latency timer coupled to the central controller, wherein a value within the programmable latency timer controls a time at which the central controller updates the status register in response to an End Of Interrupt command.

BRIEF DESCRIPTION OF THE DRAWINGS

Other objects and advantages of the invention will become apparent upon reading the following detailed description and upon reference to the accompanying drawings in which.

Figure 1:
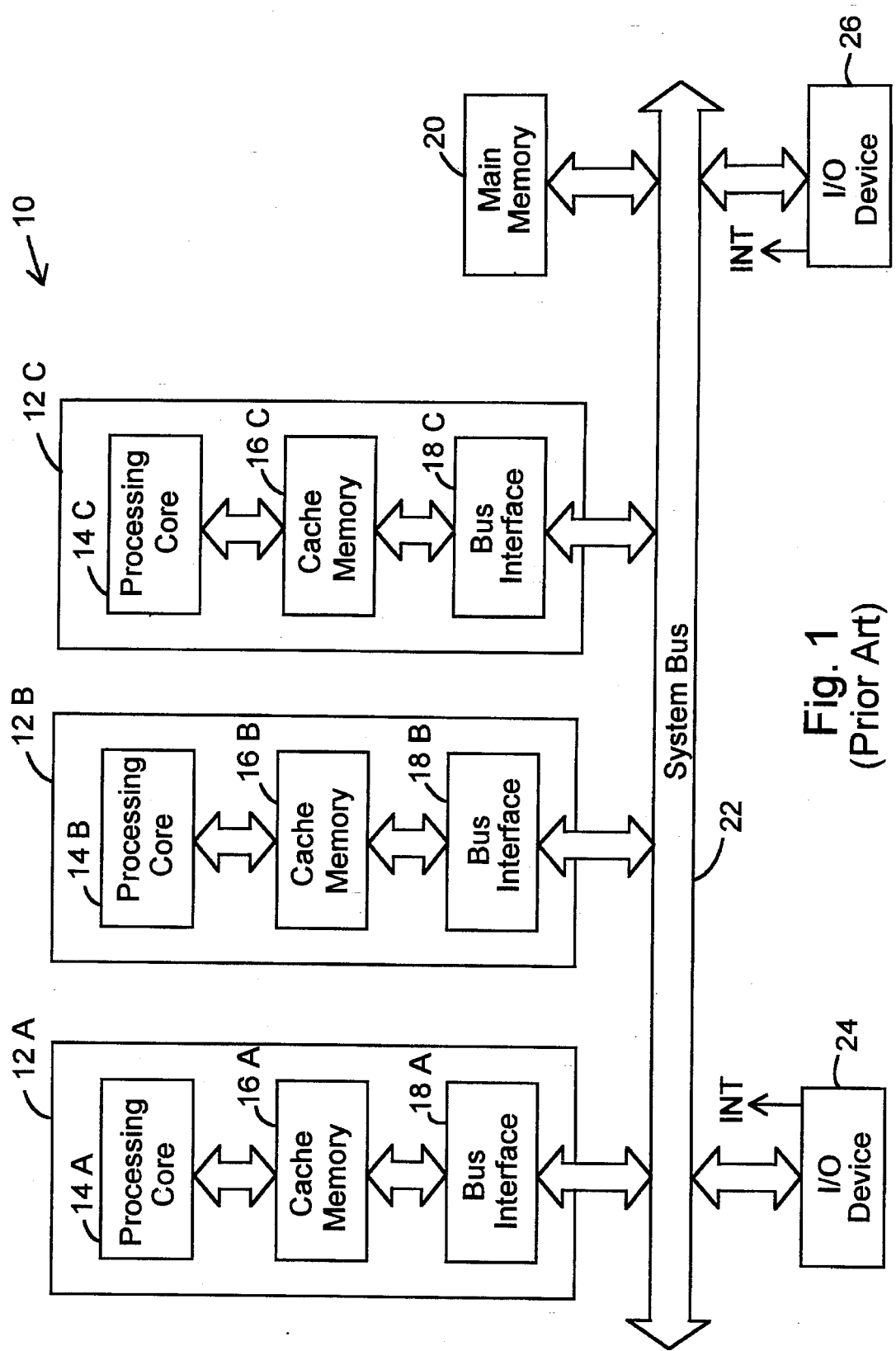
FIG. 1 is a block diagram of a typical symmetrical multiprocessing system including a plurality of processing units.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
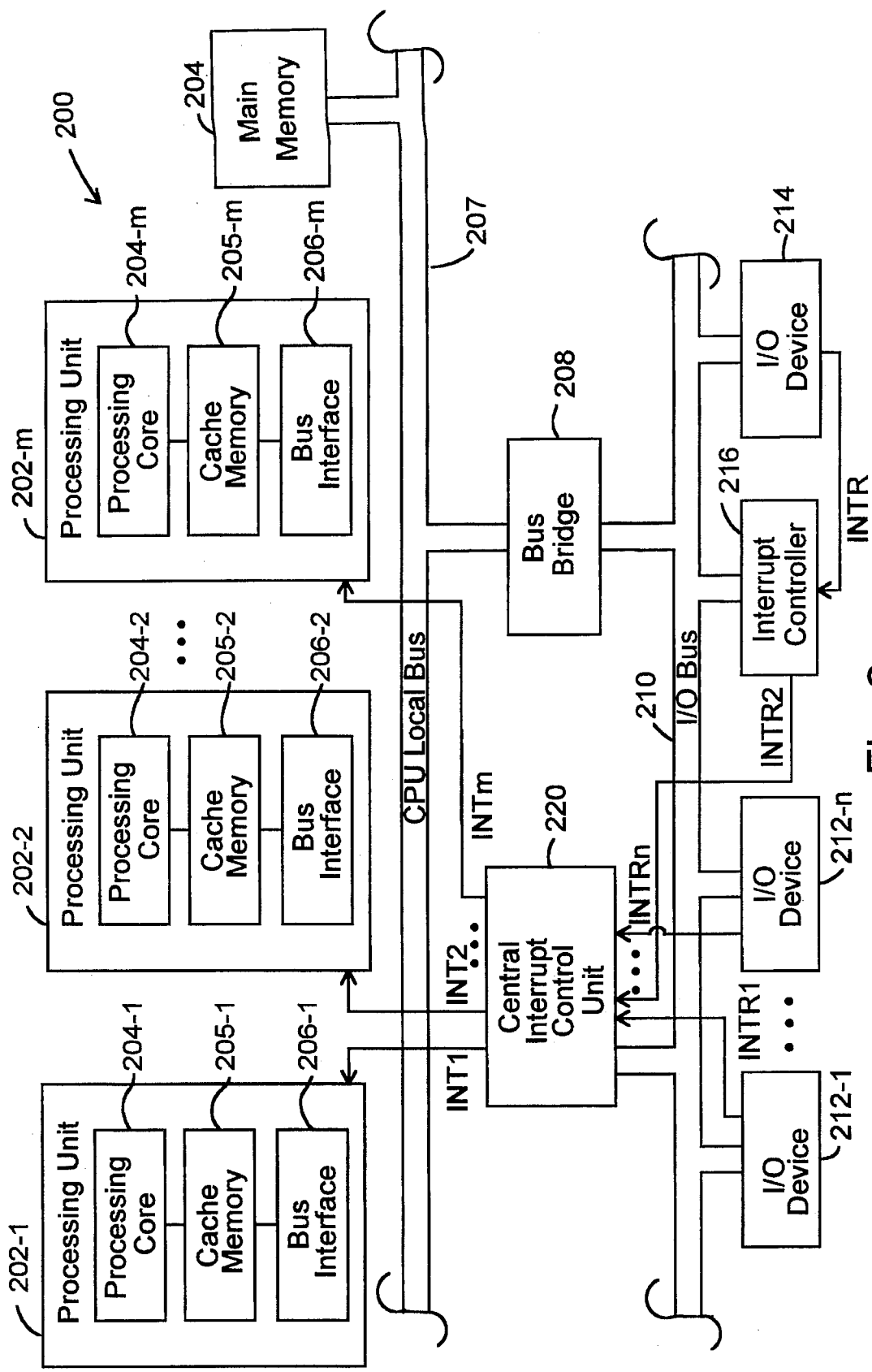
FIG. 2 is a bock diagram of a symmetrical multiprocessing system including a centralized interrupt controller mechanism according to one embodiment of the present invention.

Referring next to FIG. 2, a block diagram is shown of a symmetrical multiprocessing system 200 including a centralized interrupt controller mechanism. The system 200 includes a plurality of processing units 202-1 through 202-m coupled to a main memory 204 via a CPU local bus 207. Each processing unit 202-1 through 202-m includes a respective processing core 204-1 through 204-m, a respective cache memory 205-1 through 205-m, and a respective bus interface 206-1 through 206-m. A bus bridge 208 couples CPU local bus 207 to an I/O bus 210. A plurality of I/O peripheral devices 212-1 through 212-n are coupled to I/O bus 210. An additional I/O device 214 and an interrupt controller 216 are further coupled to I/O bus 210. I/O devices 212-1 through 212-n are coupled to a central interrupt control unit 220. I/O devices 212-1 through 212-n and 214 are accessible by each of the processing units 202-1 through 202-m through the bus bridge 208.

The central interrupt control unit 220 is provided to manage interrupts received from I/O devices 212-1 through 212-n and interrupt controller 216, and to distribute the interrupts among the processing units 202-1 through 202-m. The central interrupt control unit 220 further manages interprocessor interrupts and software interrupts generated by the processing units 202-1 through 202-m. In its preferred form, the central interrupt control unit 220 is implemented with a variety of programmable features as discussed below to accommodate optimal system flexibility.

I/O bus 210 may be any suitable bus for coupling peripheral devices such as CD-ROM units, local area network (LAN) devices, and printers to computer system 200. Exemplary peripheral bus standards include the ISA (industry standard architecture) bus, the EISA (extended industry standard architecture) bus and the PCI (peripheral component interconnect) bus. Bus bridge 208 provides an interface between I/O bus 210 and CPU local bus 207.

Processing cores 204-1 through 204-m are data processing units which operate according to a predetermined instruction set. Exemplary processing units include model 80486 processing units, Pentium compatible processing units, and PowerPC processing units. It is understood, however, that processing units 202-1 through 202-m could operate in accordance with still other instruction sets.

Cache memories 205-1 through 205-m are implemented using high speed memory devices. Each cache memory 205-1 through 205-m is associated with a cache controller (not shown separately in the figure) that orchestrates and manages the transfer of data between the associated processing core 204-1 through 204-m, the associated cache memory 205-1 through 205-m, and CPU local bus 207. In the preferred form, the cache controller of each processing unit operates concurrently with the associated processing core to provide maximum sustained performance.

CPU local bus 207 has a predetermined bit width and is the computer system's primary bus. Main memory 204 is physical memory of a predetermined size and may be implemented with DRAM (dynamic random access memory). A memory controller (not shown separately) is associated with main memory 204 which controls and orchestrates the transfer of data, address, and control signals communicating between CPU local bus 207 and main memory 204.

Interrupt controller 216 is provided for sorting and managing interrupt signals derived from a variety of interrupt sources, such as I/O device 214. Interrupt controller 216 is illustrative of, for example, a model 8259A series programmable interrupt controller manufactured by Advanced Micro Devices, Inc. The 8259A programmable interrupt controller is described within the publication "MOS Microprocessors and Peripherals"; pp. 3–371 through 3–388 Advanced Micro Devices, Inc. 1987).

Before proceeding with a detailed discussion of central interrupt control unit 220, it is noted at the onset that a variety of configuration registers are embodied within the central interrupt control unit 220. These configuration registers may be programmed and accessed via I/O bus 210. Accordingly, the central interrupt controller 220 is independent of the type of CPU local bus 207, and thus may be employed within a variety of systems using differing types of processing units. As a result, the central interrupt control unit 220 may be used in conjunction with and is compatible with a variety of multiprocessing systems.

Figure 3:
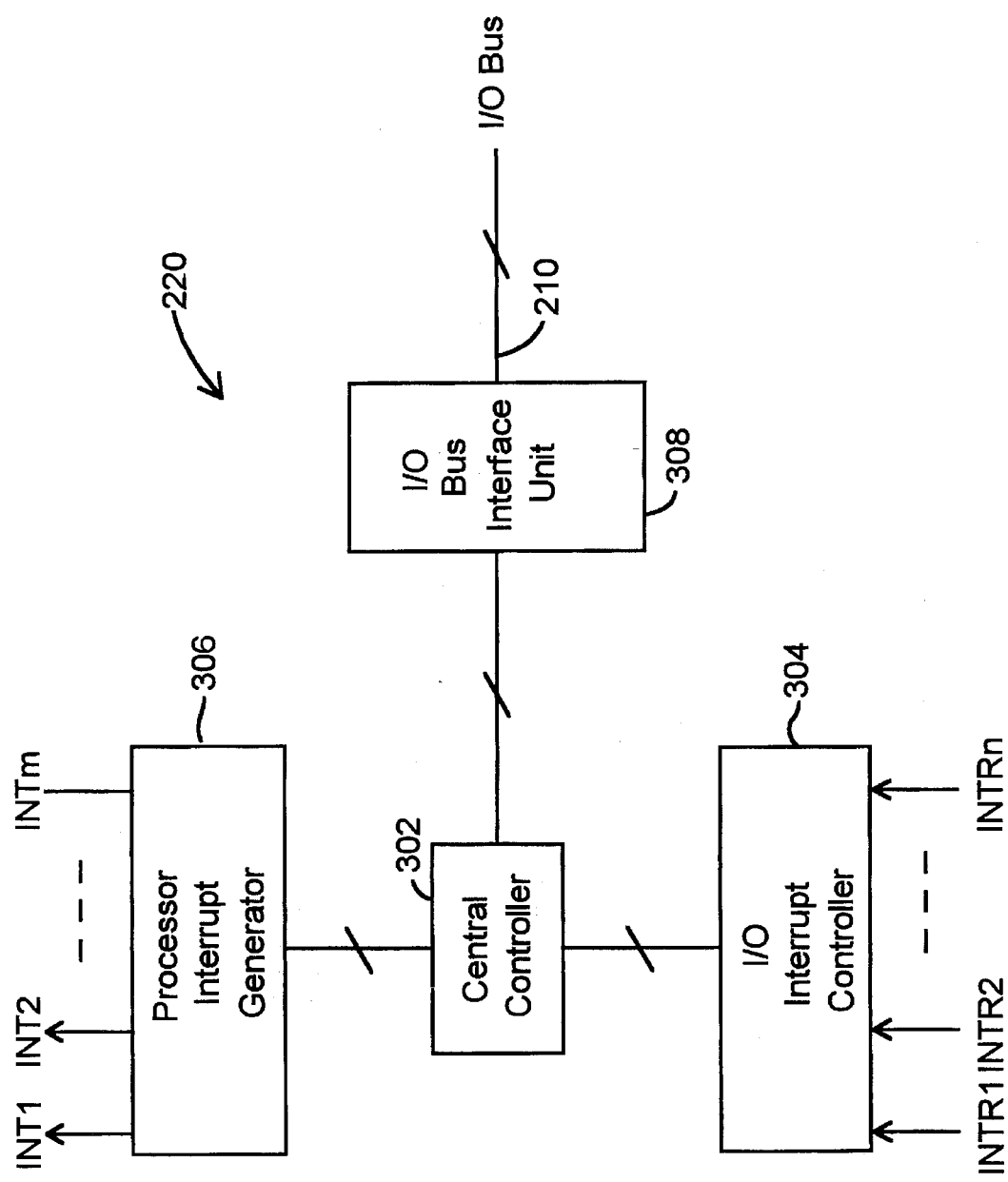
FIG. 3 is a block diagram of a central interrupt control unit.

Referring next to FIG. 3, details regarding the central interrupt control unit 220 are next considered. FIG. 3 is a block diagram of one embodiment of central control unit 220 including a central controller 302 coupled to an I/O interrupt controller 304 and to a processor interrupt generator 306. An I/O bus interface unit 308 is further shown coupled to central controller 302.

I/O bus interface unit 308 provides an interface between I/O bus 210 and central controller 302 to allow programming of the central control unit 220, as well as to accommodate other functions of the central control unit 220, as will be explained in greater detail below. It is understood that the central interrupt control unit 220 could alternatively or additionally include a CPU bus interface unit for coupling the CPU local bus 206 to the central control unit 220 for programming and other functions.

As explained previously, the central interrupt control unit 220 is capable of accepting interrupts from a variety of different I/O devices. These interrupts are received at a plurality of interrupt pins, labeled INTR1-INTRn, and are provided to I/O interrupt controller 304. The central interrupt control unit 220 is configured such that each interrupt INTR1-INTRn can be individually programmed to designate a specific type of interrupt, to specify a particular delivery mode, and to indicate its priority level. In addition, each interrupt pin can be utilized in a cascaded mode to expand the number of interrupt signals which can be received and identified at the particular pin. This will be explained further below.

Central controller 302 prioritizes the various interrupt signals and routes them to the processor interrupt generator 306, which responsively routes the interrupt signals to one or more of the processing units 202-1 through 202-m based on the delivery mode for each interrupt and the current task priority of each processing unit, among other things. The central controller 302 maintains an interrupt stack and a device table for the system, and further maintains the current task priorities of all processing units. The central controller 302 finally includes a mechanism for distributing selected interrupts that need to be handled by all processors in a broadcast fashion. This distribution mechanism will be explained in greater detail below.

As stated previously, processor interrupt generator 306 routes the various interrupts to a designated destination processing unit (or processing units). In this embodiment, the central interrupt control unit 220 is configured to distribute interrupts among a maximum of 256 processing units. The number of processing units provided within the system is programmed upon system initialization, as will be understood from the description below.

Figure 4:
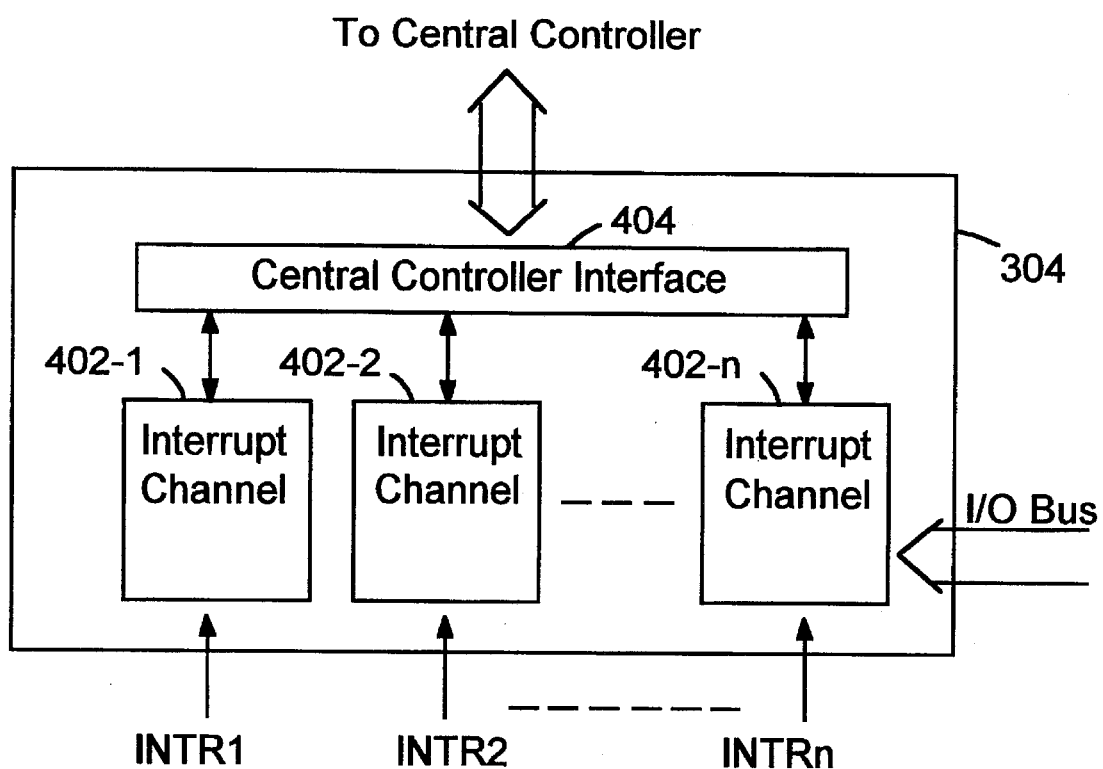
FIG. 4 is a block diagram of an I/O interrupt controller.

FIG. 4 is a block diagram of I/O interrupt controller 304. The I/O interrupt controller 304 receives interrupts from I/O devices via pins INTR1, INTR2, . . . INTRn. The I/O interrupt controller 304 includes a plurality of interrupt channels 402-1 through 402-n coupled to pins INTR1-INTRn, respectively. A central controller interface 404 is coupled to each to interrupt channel 402-1 through 402-n. The interrupt channels 402-1 through 402-n provide dedicated channels through which interrupts received at the associated interrupt pins INTR1-INTRn, respectively, are processed. In one embodiment, the I/O interrupt controller 304 includes a total of sixteen interrupt input pins, each of which can be cascaded with sixteen interrupt signals to support a maximum of 256 unique interrupt vectors.

A plurality of registers (not shown in FIG. 4) are provided within each interrupt channel 402-1 through 402-n to control the processing of each incoming interrupt. These registers are mapped either within the memory space or the I/O space of the system. Further details regarding the internal registers of interrupt channels 402-1 through 402-n are provided below.

Each interrupt channel 402-1 through 402-n detects the assertion of an interrupt signal at its associated input pin INTR1-INTRn and processes the interrupt signal to verify whether the interrupt should be dispatched to the processing units. Interrupt characteristics can be programmed individually, and implied positional dependence is not attached to any of the interrupt channels 402-1 through 402-n.

Figure 5:
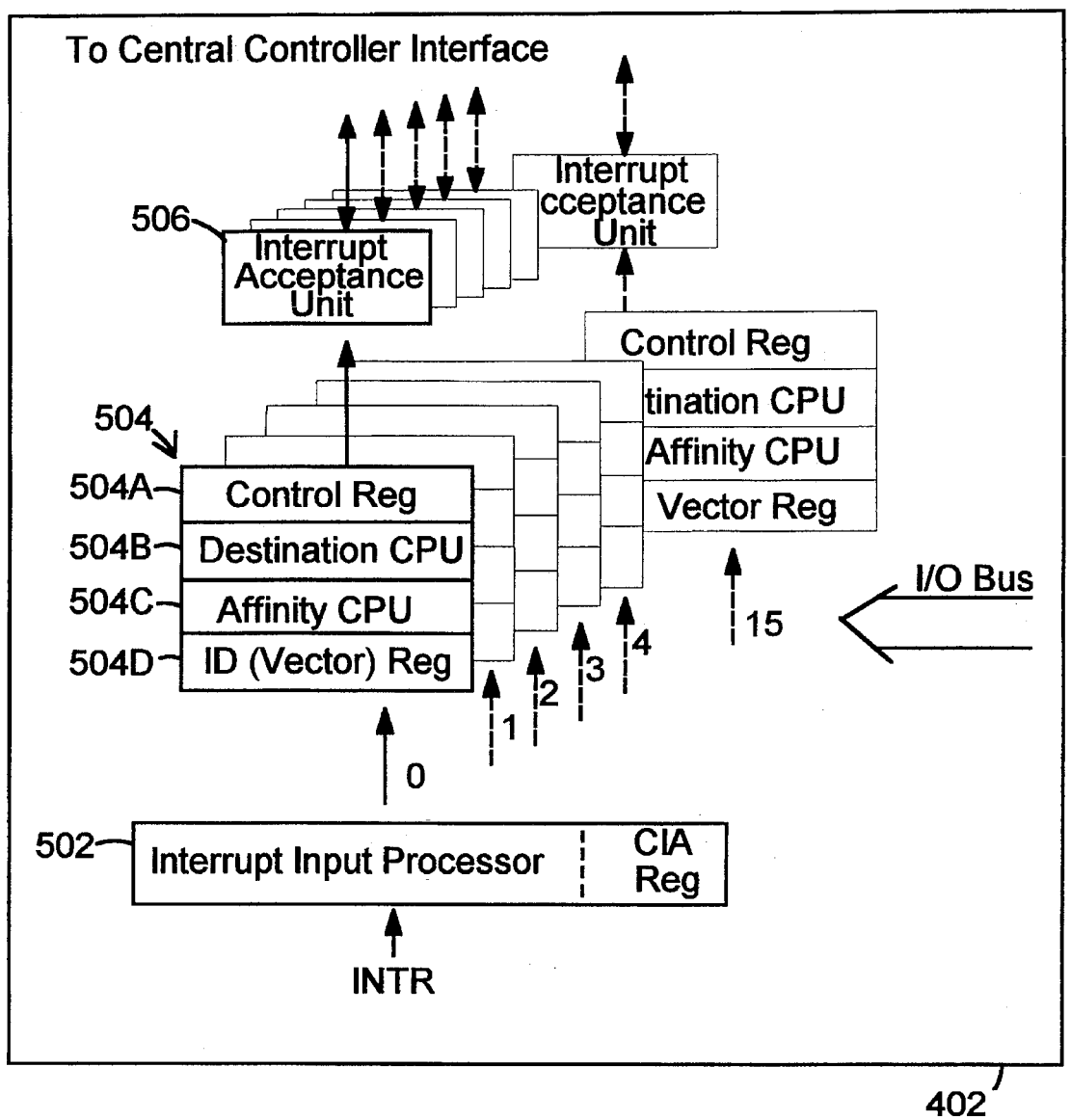
FIG. 5 is a block diagram illustrative of an interrupt channel.

FIG. 5 is a block diagram illustrative of each of the interrupt channels 402-1 through 402-n. The interrupt channel 402 of FIG. 5 includes an interrupt input processor 502 coupled to a registers unit 504 and an interrupt acceptance unit 506. The interrupt input processor 502 processes the interrupt signal (or signals, if cascade mode is programmed) on the INTR pin and determines the mode of transfer for cascaded interrupts. If the pin is programmed to be a cascaded pin, the index of the current cascaded interrupt is determined and stored in a cascade interrupt address (CIA) register. It is noted that when the interrupt channel 402 is operated in a cascade mode, the number of registers units 504 and the number of interrupt acceptance units 506 are effectively duplicated fifteen times, such that a separate interrupt sub-channel is provided for each possible cascaded interrupt signal. These sub-channels are illustrated in phantom within FIG. 5.

Each interrupt signal is associated with a programmable control register 504A, a destination CPU register 504B, an affinity CPU register 504C, and an ID (vector) register 504D. Based on the information within the control register 504A, the interrupt acceptance unit 506 processes the signal on the INTR pin. If the interrupt is a genuine, enabled, and acceptable signal, it is passed on the central controller interface 404 (of FIG. 4) to be delivered to one or more of the processing units.

As stated previously, each INTR pin can be programmed in a cascade mode wherein the interrupt pin may receive a cascaded signal representing sixteen distinct interrupts. When a pin is programmed to be cascaded, sixteen individual sets of registers units and interrupt acceptance units will be associated with the interrupt channel, as illustrated in phantom in FIG. 5. The cascade modes of central control unit 220 will be explained in greater detail below.

Figure 6:
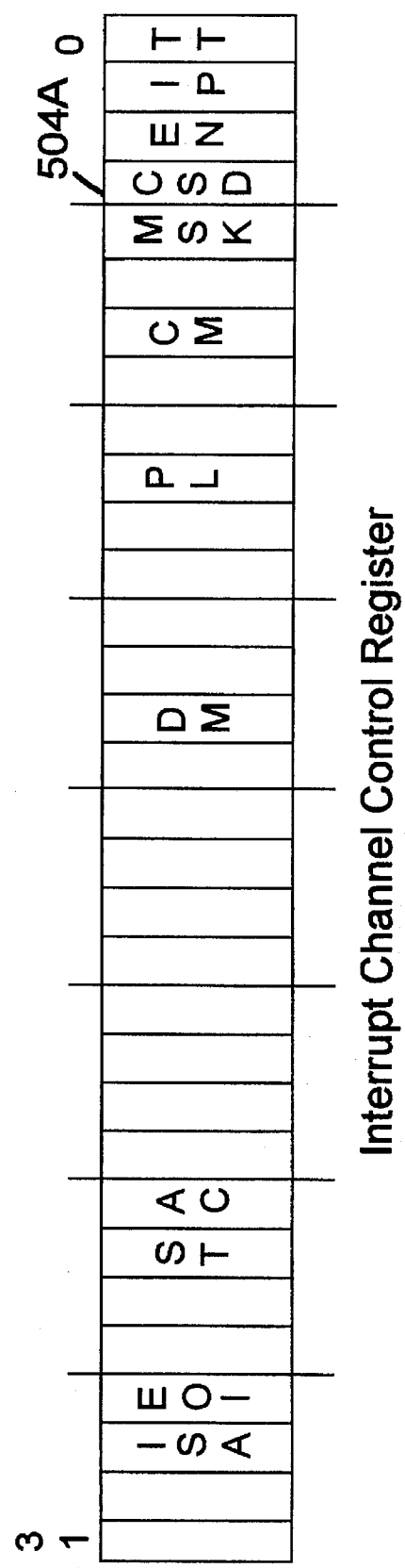
FIG. 6 is a diagram of an interrupt channel control register and its associated fields.

The various registers of each interrupt channel (or sub-channel) are next considered. As stated previously, a separate set of registers are provided for each possible interrupt signal. These registers are labeled the control register 504A, the destination CPU register 504B, the affinity CPU register 504C, and the ID register 504D. These registers are visible to software and are located in either memory mapped or I/O mapped system space. A separate control register 504A is provided for each interrupt signal and is programmable. The control register 504A for each interrupt signal defines and dictates the functionality of each INTR pin, and each may be embodied by a 32-bit register. FIG. 6 illustrates the fields associated with the control register 504A, and Table 1 describes the various fields of the control register 504A. Table 2 indicates the cascade mode encoding, Table 3 indicates the delivery mode encoding, and Table 4 indicates the status bits encoding. As indicated by Tables 1–4, the control register 504A stores various information for defining the type of interrupt signal that will be provided to the channel, the mode of the interrupt pin (i.e., normal or cascade mode), whether the interrupt signal is currently masked, the priority level associated with the interrupt, the delivery mode, along with other parameters associated with the interrupt.

TABLE 1

IIC Control Register Fields

| Field | Name | Bits | Explanation |
|---|---|---|---|
| TT | Trigger Type | 1 | Interrupt is edge triggered or level triggered |
| IP | Interrupt Polarity | 1 | Polarity of the interrupt (active high or low) |
| EN | Enable | 1 | Corresponding interrupt is being used |
| CSD | Cascade | 1 | Enables the pin to be a cascaded interrupt |
| MSK | Mask | 1 | Interrupt is masked |
| CM | Cascade Mode | 2 | Cascaded Interrupt vector delivery mode - refer to Table 2 |
| PL | Priority Level | 4 | Priority Level assigned to the interrupt |
| DM | Delivery Mode | 3 | Mode of delivering the interrupt - refer to Table 2 |
| AC | Affinity CPU | 1 | This interrupt has an affinity CPU |
| ST | Status | 2 | Current status of the interrupt - refer to Table 4 |
| EOI | EOI enabled | 1 | Enable EOI latency timer for level triggered interrupts |
| ISA | ISA mode | 2 | System is in ISA mode |

TABLE 2

Cascade Mode Definition

| CM(1:0) | Definition |
|---|---|
| 00 | Serial coded mode |
| 01 | Serial 16-bit mode |
| 10 | 8259 mode |
| 11 | TBD |

TABLE 3

Delivery Mode Definition

| DM(2:0) | Definition |
|---|---|
| 000 | Fixed: Deliver the interrupt to the CPU/CPUs in destination CPU register |
| 001 | Lowest Priority: Delivery the interrupt to the processor executing at lowest priority |
| 010 | Broadcast: Deliver the interrupt to all the CPUs |
| 011 | TBD |
| 100 | NMI: Deliver a level triggered interrupt to destination CPUs as NMI |
| 101 | Reset |
| 110 | SMI: Deliver a level triggered interrupt to destination CPUs as SMI |
| 111 | TBD |

TABLE 4

Status Bits Definition

| ST(1:0) | Definition |
|---|---|
| 00 | Idle |
| 01 | Being serviced (dispatched and acknowledged) |
| 10 | Dispatched from the CIC (but not acknowledged) |
| 11 | Queued in the CC |

Referring back to FIG. 5, the definition of the destination CPU register 504B depends on the delivery mode and the current status of the associated interrupt signal. If the interrupt is not being serviced, the destination CPU register 504B has the ID of the processing unit or group of processing units that the interrupt is being targeted to. If the interrupt is being serviced, the destination CPU register 504B has the ID of the processing unit that is servicing the interrupt. If the delivery mode is broadcast or lowest priority, this register conveys no associated meaning.

The affinity CPU register 504C holds the ID of the processing unit 202-1 through 202-m (FIG. 2) that serviced the interrupt most recently. The ID register 504D contains the ID (or vector) of the interrupt.

Interrupts are processed by the respective interrupt acceptance unit 506 before passing them on to the central controller 302 via central controller interface 404. If the interrupt is enabled (EN of ICR) and not masked (MSK of ICR), it is passed on to the central controller 302 along with the information about the delivery mode, destination processing unit (if any), priority level and interrupt ID.

As stated above, the architecture allows for each interrupt pin INTR1-INTRn of the central interrupt control unit 220 to be programmed as either a direct interrupt or as a cascaded interrupt. If the cascade bit in the control register 504A is set, the associated interrupt channel accommodates a total of fifteen additional expansion interrupts. Each of these expansion interrupts are associated with a dedicated interrupt control register (ICR) 504A, a destination CPU register 504B, an affinity CPU register 504C, and an ID register 504D, as illustrated in phantom in FIG. 5. Except for the fact that the CSD, CM and ISA fields of the expansion interrupt control registers are undefined, these registers are identical to the ones defined by Tables 1-4.

The CM field determines the method used to access one of sixteen interrupts in cascade mode. The index of one of sixteen interrupts is determined by the CIA register located in the interrupt input processor. The CM mode determines the mechanism of computing the CIA.

Figure 7:
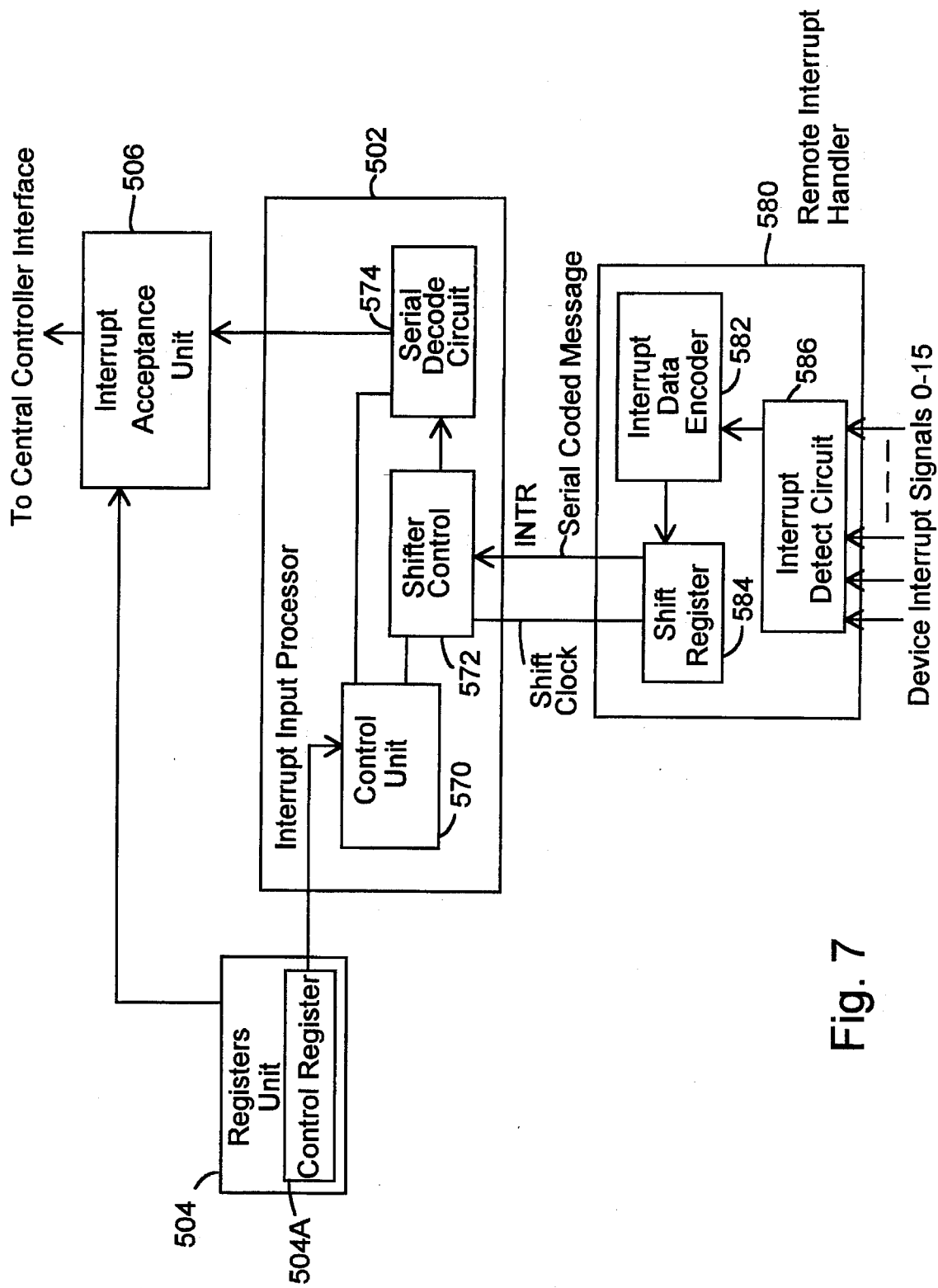
FIG. 7 is a block diagram that illustrates the hardware associated with the symmetrical multiprocessing system during one cascading mode of an interrupt input processor.
Figure 8:
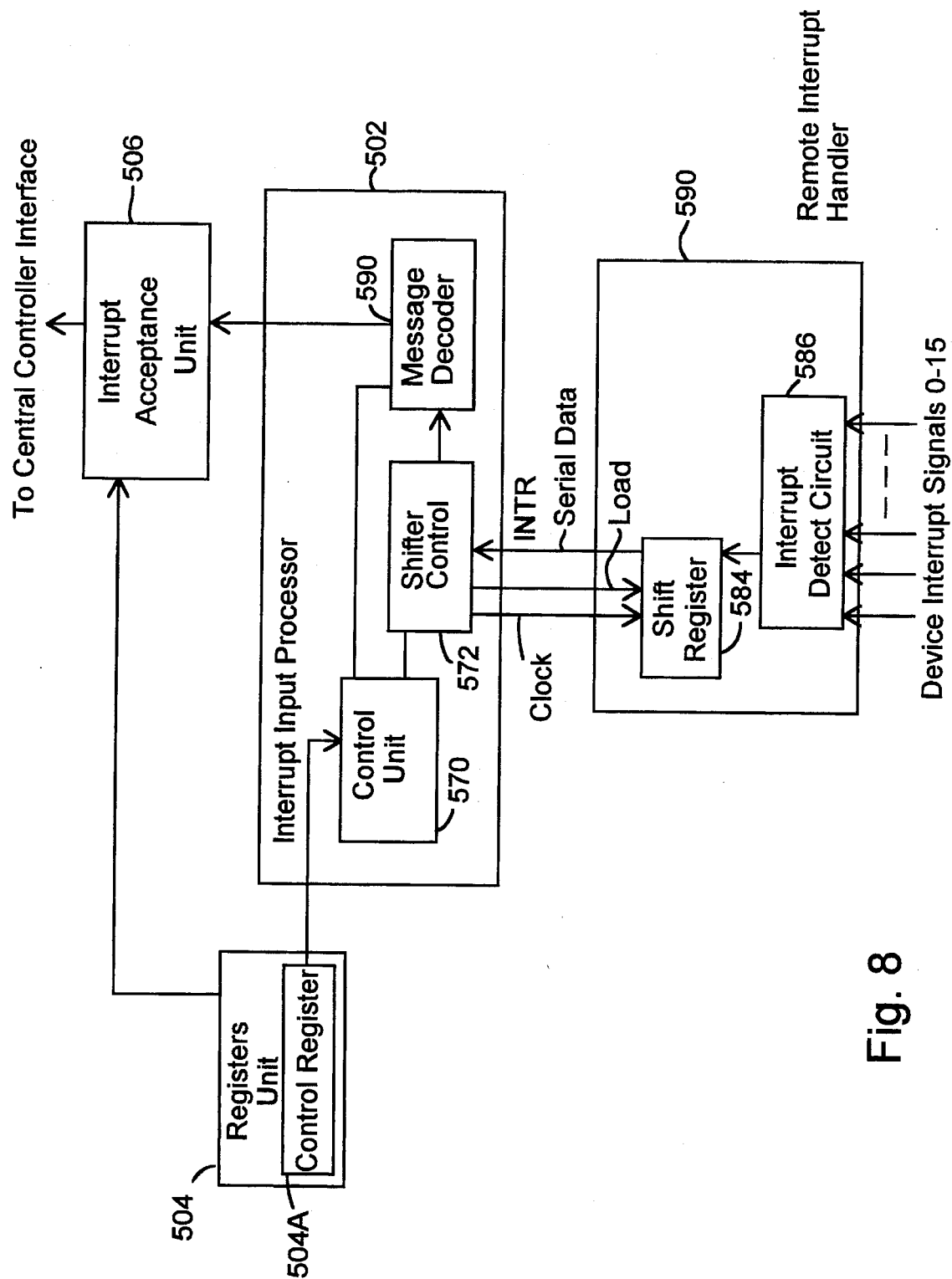
FIG. 8 is a block diagram that illustrates hardware associated with another cascading mode of the symmetrical multiprocessing system.

FIGS. 7 and 8 illustrate hardware configurations for cascading a particular pin. It is noted that the central interrupt control unit 220 supports interrupt expansion via three different cascading modes. The first two modes allow a single physical interrupt pin INTR1-INTRn to route the interrupts of multiple I/O devices to selected interrupt sub-channels. The third mode allows for the integration of a conventional 8259-type interrupt controller within the computer system. This provides traditional PC hardware and software compatibility.

Referring first to FIG. 7, a hardware configuration is illustrated for what is referred to as the "serial coded" mode. FIG. 7 is a block diagram that illustrates internal portions of the interrupt input processor 502 which are activated when the particular interrupt channel is set in the serial coded cascade mode. As illustrated in FIG. 6, the interrupt input processor 502 includes a control unit 570 coupled to a shifter control 572 and a serial decode circuit 574. The control unit 570 is responsive to the CSD and CM fields of the corresponding control register 504A. When the CM field (i.e., cascade mode field) indicates that the current mode is serial coded cascade mode, the control unit 570 activates the shifter control 572 and the serial decode circuit 574 such that serially transmitted encoded data at the corresponding interrupt pin INTR is decoded to identify activity of a particular interrupt signal. The interrupt input processor 502 is shown coupled to a remote interrupt handler 580 which includes an interrupt data encoder coupled to a shift register 584 and to a parallel interrupt detect circuit 586.

A plurality of interrupt signals 0 to 15 are provided to parallel interrupt detect circuit 586. The remote interrupt handler 580 gathers the device interrupts and communicates the status of each interrupt signal to the central interrupt control unit via a coded serial message on the INTR line of the associated interrupt channel. Parallel interrupt detect circuit 586 monitors the interrupt signals provided to the remote interrupt handler 580. If a transition occurs in any of the interrupt signals, the interrupt data encoder 582 causes an encoded serial message to be broadcast to the interrupt input processor 502 via shift register 584. The serial data is transmitted on a serial coded message line which is provided to the INTR line of the interrupt channel. The shift register 584 provides a synchronizing shift clock to the interrupt input processor 502 as each serial coded message is being transmitted.

In one embodiment, the encoded messages consist of a cascaded interrupt signal number and interrupt state in a 6-bit form. A possible encoding scheme is as follows:

| Bits 5:4 Interrupt State | 00 | interrupt transitioned to low |
|---|---|---|
| | 01 | interrupt transitioned to high |
| | 10 | reserved |
| | 11 | reserved |
| Bits 3:0 interrupt number for cascaded interrupt input signals numbered 0 to 15 | | |

Consider, for example, a situation in which interrupt signal 3 transitions from low to high. This transition is detected by the parallel interrupt detect circuit 586. The interrupt data encoder 582 responsively generates an encoded value indicative of the type of transition that occurred and the particular interrupt signal that made the transition. For example, if the above coding scheme is employed, an encoded value of "010111" would represent a transition to high ("01") in interrupt signal 7 ("0111"). The encoded value is then provided to shift register 584, which initiates a serial transmission which is received by the shifter control unit 572. The serial decode unit 574 then decodes the received message in accordance with the coding scheme of the interrupt data encoder 582, and provides the message to the interrupt acceptance unit 506 of the designated interrupt sub-channel. The interrupt acceptance unit 506 for the corresponding interrupt signal then passes the interrupt on to the central controller 302 if the interrupt is enabled (EN of the control register) and not masked (MSK of control register). Similar to the previous description, when an interrupt acceptance unit 506 passes an interrupt on to the central controller 302, the interrupt is passed along with the information regarding the delivery mode, the destination CPU (if any), the priority level, and the interrupt ID for the interrupt signal.

In accordance with the serial coded cascade configuration of FIG. 6, the serial channel is active only when activity occurs on one or more of the interrupt signal lines, and thus provides a low power and electrically-quiet expansion technique. Furthermore, the encoding scheme provides reserved values to accommodate additional types of messages.

FIG. 8 is a block diagram of an alternative cascading configuration. Circuit portions that correspond to those of FIG. 7 are numbered identically. In this configuration, rather than encoding a value indicative of activity of a particular interrupt signal, the state of the parallel interrupt detect circuit 586 is communicated continuously and directly to interrupt input processor 502 via shift register 584. As such, shift register 584 continuously generates a serial signal indicative of the state of parallel interrupt detect circuit 586, and shifter control unit 572 converts the serial transmission to parallel data. The parallel data is then decoded by message decoder 590 which passes a detected interrupt signal transmission to the corresponding interrupt acceptance unit 506 along with the associated control and vector information within the corresponding registers unit 504.

In this configuration, the interrupt input processor 502 continually clocks the remote interrupt shift register 584. It must then keep track of which interrupt the current data belongs to and route it to the appropriate channel. The data is simply "interrupt high" or "interrupt low". The central controller (or interrupt acceptance unit 506) must then determine if the data represents a change in the interrupt state and therefore what action, if any, should be taken.

Figure 9:
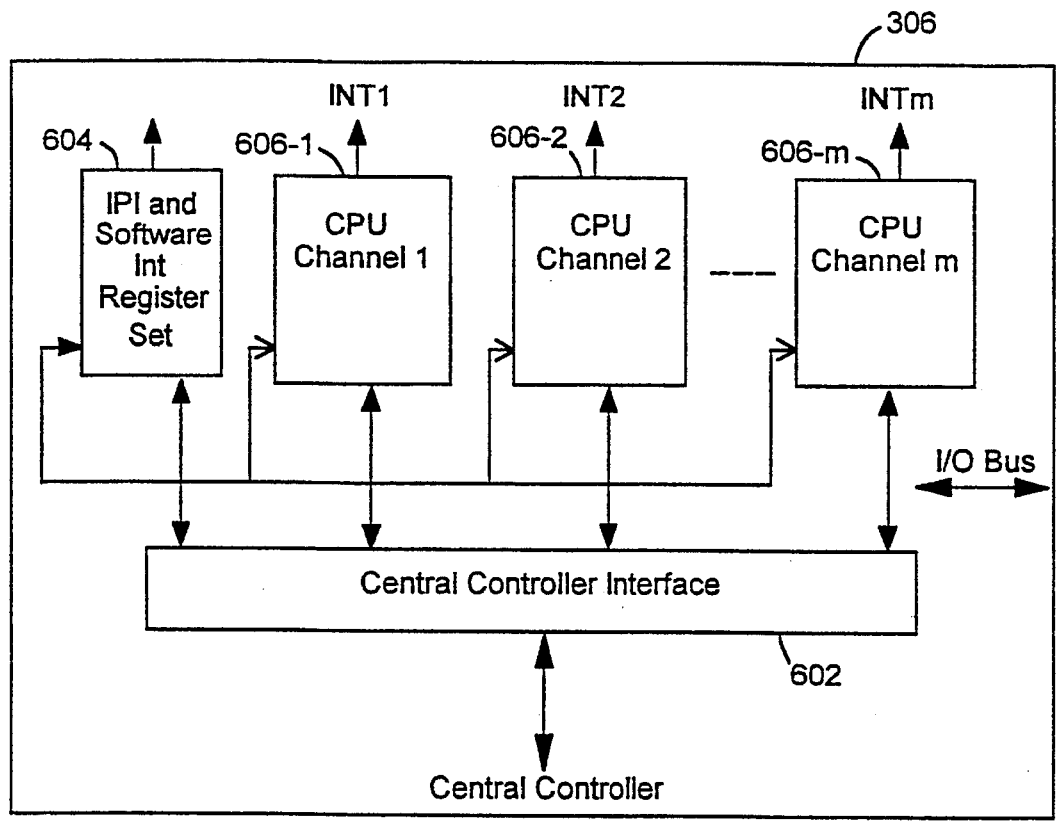
FIG. 9 is a block diagram of a processor interrupt generator.

Additional aspects of the central interrupt control unit 220 of FIG. 2 are considered next. Referring to FIG. 9, a block diagram is shown which is illustrative of the processor interrupt generator 306. As stated previously, the processor interrupt generator 306 receives interrupt information from the central controller 302 and generates processor interrupt signals labeled INT1-INTm to be delivered to the processing units. As illustrated in the figure, the processor interrupt generator 306 includes a central controller interface 602, an interprocessor interrupt (IPI) and software interrupt register set 604, and a set of CPU channels 606-1 through 606-m. Each processing unit in the system receives an interrupt from an associated CPU channel 606-1 through 606-m of the processor interrupt generator 306. The CPU channels 606-1 through 606-m receive interrupts from the central controller 302 (FIG. 3) through central controller interface 602 and dispatches them to the appropriate processing unit (or units).

Figure 10B:
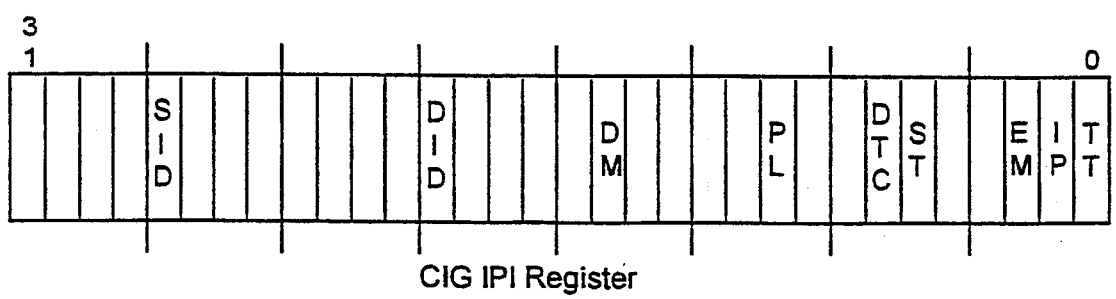
FIG. 10B is a diagram that illustrates an interprocessor interrupt register along with its associated fields.
Figure 10:
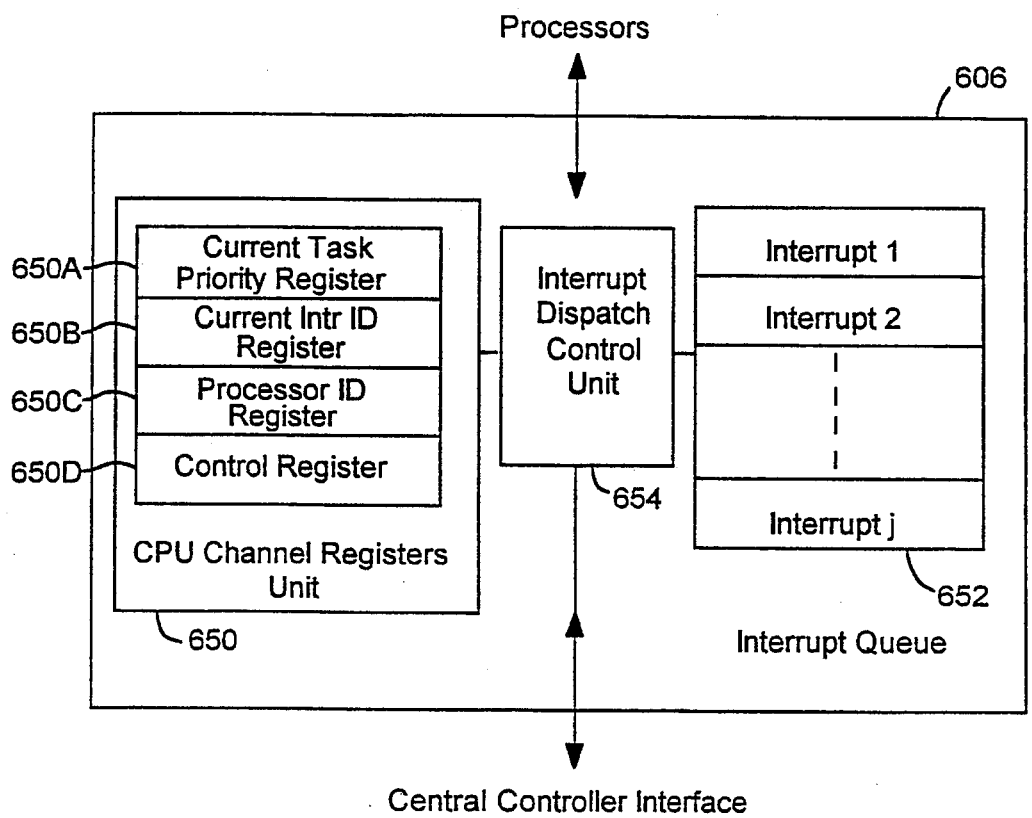
FIG. 10 is a block diagram illustrative of a processor channel.

FIG. 10 is a block diagram illustrative of each of the processor channels 606-1 through 606-m. The CPU channel 606 of FIG. 10 includes a CPU channel registers unit 650 and an interrupt queue 652 coupled to an interrupt dispatch control unit 654. The interrupt dispatch control unit 654 dispatches pending interrupts to the corresponding processing unit.

The CPU channel registers unit 650 includes a current task priority register 650A, a current interrupt ID register 650B, a processor ID register 650C, and a control register 650D. The functions and bit definitions of each of these registers is described next.

Figure 10A:
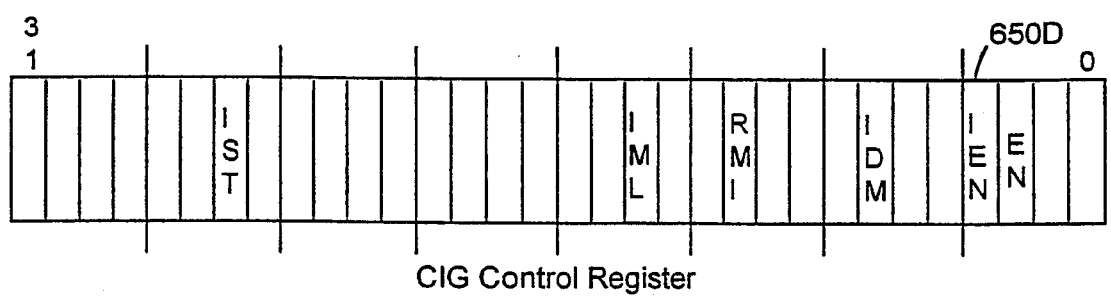
FIG. 10A is a diagram that illustrates a CPU channel control register along with its associated fields.

Each processing unit in the system is assigned a dedicated control register 650D to dictate the functionality as seen by the central interrupt control unit 220. These are 32-bit programmable registers which are mapped within either I/O or memory space of the system. FIG. 10A illustrates a CPU channel control (CIG) register 650D along with its associated fields, and Tables 5 through 7 describe each of the fields within the control register.

TABLE 5

| CIG Control Register Fields | | | |
|---|---|---|---|
| Field | Name | Bits | Explanation |
| EN | Enable | 1 | This CPU channel is being used |
| IEN | Interrupt Enable | 1 | The CPU connected to this channel will accept the interrupts |
| ITM | Interrupt Transmit Mode | 2 | Mechanisms for delivering the interrupts to the CPU - refer to Table 6 |

TABLE 5-continued

CIG Control Register Fields

| Field | Name | Bits | Explanation |
|---|---|---|---|
| RMI | Real Mode Interrupt | 1 | This interrupt is delivered in "real mode" |
| IML | Interrupt Mask Level | 4 | Mask all the interrupts at or below this priority level |
| IST | Interrupt Status | 2 | Reflects the status of the interrupt on this channel - refer to Table 7 |

TABLE 6

Interrupt Transmission Mechanism Definition

| ITM(1:0) | Definition |
|---|---|
| 00 | Deliver the interrupts on separate pins |
| 01 | Deliver the interrupts on the CPU bus |
| 10 | Use dedicated interrupt delivery bus (say, 4-bit wide) to deliver the interrupts |
| 11 | TBD |

TABLE 7

Interrupt Status Definition

| IST(1:0) | Definition |
|---|---|
| 00 | No interrupt is being serviced |
| 01 | Interrupt being serviced by the CPU |
| 10 | Interrupt dispatched to the CPU, not yet acknowledged |
| 11 | TBD |

The processor ID register 650C contains the ID of the processing unit 202-1 through 202-m associated with the specific channel. The current interrupt ID register 650B is provided to store the ID (vector) of the interrupt that is being serviced by the processing unit connected to the channel. The current interrupt ID register 650B is valid only when the status field of the control register indicates that an interrupt is being serviced. The current task priority register 650A reflects the priority of the task being executed by the processing unit affiliated with the channel.

Referring back to FIG. 9, the interprocessor interrupt and software interrupt register set 604 provides a set of registers logically accessible at the same locations from all of the CPU channels. The space in this register set provides unique register views to each CPU channel by using the processor ID as an index. Thus, when two processors generate read/write cycles to these registers mapped at the same logic location, they will actually be accessing separate physical registers. The processing units write to these registers to initiate interprocessor interrupts or to schedule software interrupts.

FIG. 10B illustrates the interprocessor interrupt (IPI) register format and its fields. All IPI registers are accessible to the software at either an I/O location or a memory location of the system. The ID of the processing unit is used as an index to determine which register is being accessed. Tables 8 through 11 provide descriptions of the various fields within each IPI register.

TABLE 8

CIG IPI Register Fields

| Field | Name | Bits | Explanation |
|---|---|---|---|
| TT | Trigger Type | 1 | Interrupt is edge triggered or level triggered |
| IP | Interrupt Polarity | 1 | Polarity of the interrupt (active high or low) |
| EN | Enable | 1 | Corresponding interrupt is being used |
| ST | Status | 2 | Current Status of the IPI - refer to Table 9 |
| DTC | Destination Code | 2 | IPI's destination code - refer to Table 10 |
| PL | Priority Level | 4 | Priority Level assigned to the interrupt |
| DM | Delivery Mode | 3 | Mode of delivering the interrupt - refer to Table 11 |
| DID | Destination ID | 8 | Destination processor ID to which the IPI is scheduled for |
| SID | Source ID | 8 | Originating processor ID |

TABLE 9

IPI Register Status Field Definition

| ST(1:0) | Definition |
|---|---|
| 00 | Idle |
| 01 | Being serviced (dispatched and acknowledged) |
| 10 | Dispatched from the CIC (but not acknowledged) |
| 11 | Queued in the CC |

TABLE 10

IPI Register Destination Code Field Definition

| DTC(1:0) | Definition |
|---|---|
| 00 | Destination ID field (DID) of the IPI register |
| 01 | Self |
| 10 | Broadcast |
| 11 | All processor excluding self |

TABLE 11

IPI Register Delivery Mode Field Definition

| DM(2:0) | Definition |
|---|---|
| 000 | Fixed: Deliver the interrupt to the CPU/CPUs in destination CPU register |
| 001 | Lowest Priority: Deliver the interrupt to the processor executing at lowest priority |
| 010 | TBD |
| 011 | TBD |
| 100 | NMI: Deliver a level triggered interrupt to all CPUs as NMI |
| 101 | Reset: |
| 110 | TBD |
| 111 | TBD |

A processing unit performs a write to its IPI register when it has scheduled an interprocessor interrupt. If a processing unit can schedule multiple interprocessor interrupts, it should monitor the ST (status) field of the IPI register. If this field is idle, then the processing unit can inject an interprocessor interrupt into the system. If a processing unit injects an interprocessor interrupt without checking the status of the IPI register and if the ST field is not idle, then the current interprocessor interrupt and any previously scheduled interprocessor interrupts destiny will be undetermined. It is noted that a software interrupt register for each processor channel may further be provided which has a format identical to that specified for the interprocessor interrupt register. For software interrupts, however, a requested interrupt is delivered only to the interrupt-requesting processing unit.

Figure 11:
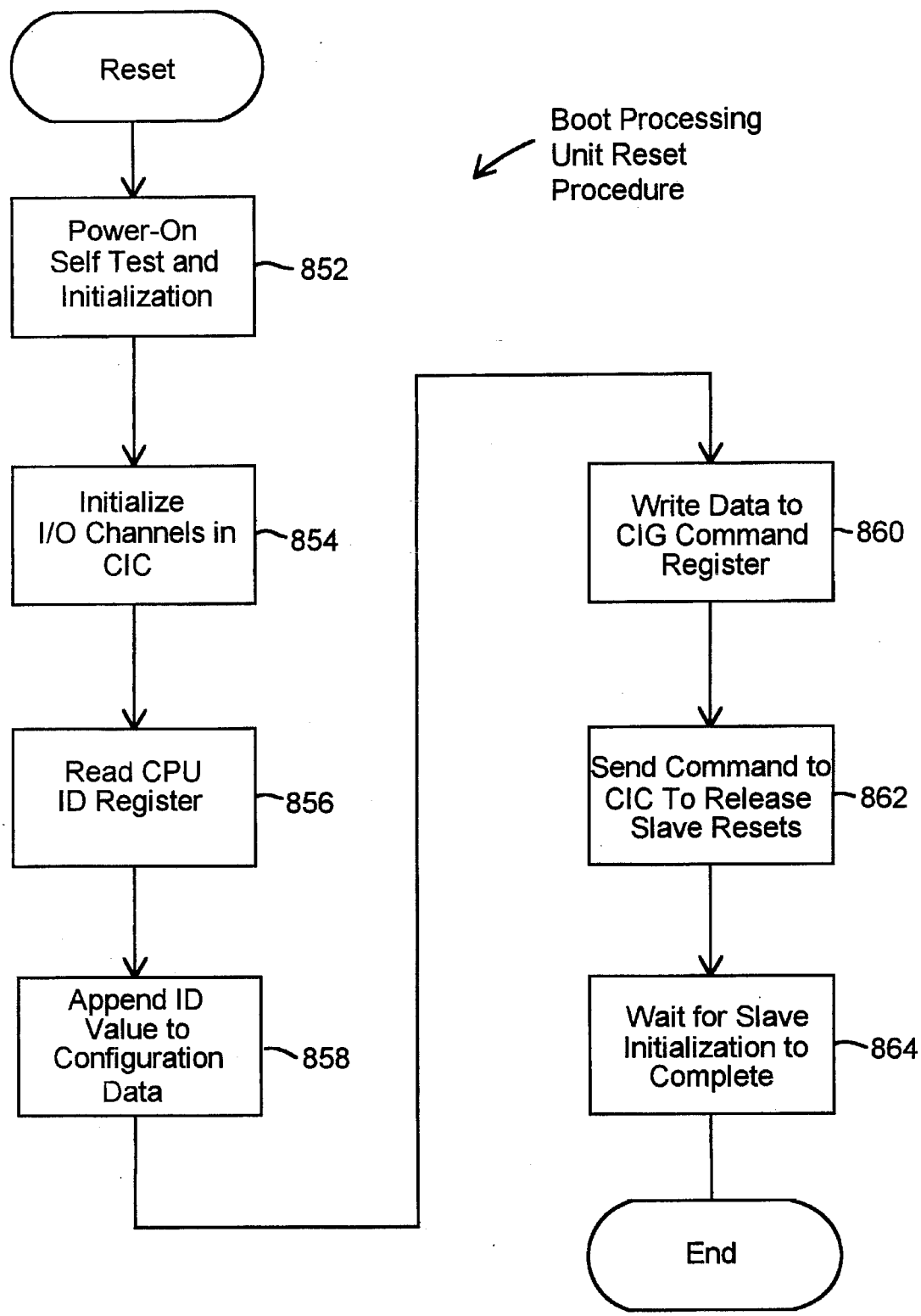
FIG. 11 is a flow diagram which illustrates the operation of the boot processing unit upon system reset.

Referring back to FIG. 2, details regarding the start-up of the computer system 200 as well as the initialization of the various configuration registers within central interrupt control unit 220 are next considered. During system configuration, one of the processing units 202-1 through 202-m is designated as the "boot" processing unit. It is assumed in the below discussion that processing unit 202-1 has been designated as the boot processing unit. FIG. 11 is a flow diagram which illustrates the operation of the boot processing unit upon system reset. During a step 852, the processing unit 202-1 begins a power-on self test procedure and an initialization procedure. It is noted that initially, the other processing units 202-2 through 202-m are held in reset by central control unit 220. During step 854, the processing unit 202-1 initializes the registers unit 504 (i.e., the control register 504A, and the ID (vector) register 504D) of each interrupt channel. As stated previously, the registers unit 504 of each interrupt channel is mapped within the I/O or memory space of the computer system. Each register of each interrupt channel is designated with a predetermined and unique address. The initialization data provided to the registers unit 504 of each interrupt channel is typically stored within the BIOS code of main memory 204. As such, the BIOS code for initializing the registers unit 504 of each interrupt channel is dependent upon the particular system configuration (i.e., the number and type of interrupt-generating resources) and must be provided by the system programmer.

The CPU channel 606-1 of central interrupt control unit 220 that connects to processing unit 202-1 must also be initialized. It is noted, however, that the current task priority register 650A, the current interrupt ID register 650B, the processor ID register 650C, and the control register 650D for a particular CPU channel 606-1 through 606-m reside and are mapped at the same system address locations (either I/O or memory space) as the corresponding registers for the other CPU channels. That is, the address of the current task priority register 650A is identical for each CPU channel 606-1 through 606-m. Similarly, the address of current interrupt ID register 650B for each CPU channel is identical, as are the address values for the processor ID register 650C and the control register 650D of each CPU channel. A processing unit ID value is thus associated with each processing unit 202-1 through 202-m which is embedded within a designated command for initializing or updating the CPU channel registers unit 650 of each CPU channel 606-1 through 606-m. This will be explained in greater detail below.

Figure 12:
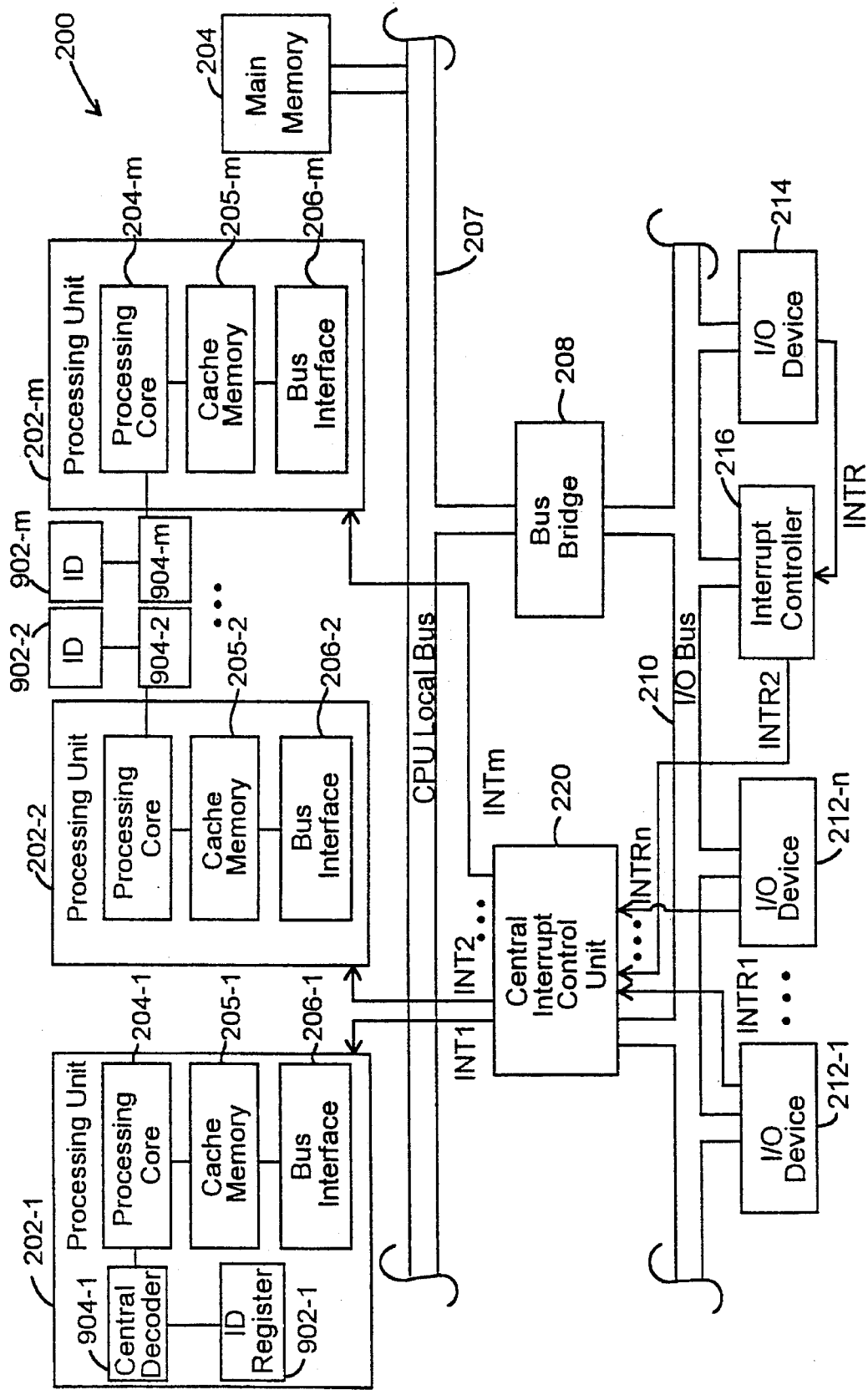
FIG. 12 is a diagram that illustrates hardware which enables the CPU channel registers unit of each CPU channel.

FIG. 12 is a diagram that illustrates in greater detail the hardware which enables the CPU channel registers unit 650 of each CPU channel 606-1 through 606-m to be initialized and updated during normal execution. FIG. 12 illustrates an ID register 902-1 which is associated with processing unit 202-1. Identical ID registers 902-2 through 902-m are also associated with processing units 202-2 through 202-m, respectively. Each ID register 202-1 through 202-m contains a value which uniquely identifies the particular processing unit. The ID value of each processing unit may be a hardwired value or may be provided during system configuration. For example, if fifteen processing units are connected within the system, the ID values within ID registers 902-1 through 902-16 may range from 0 to 15, respectively. Each ID register 902-1 through 902-m may be accessed through software command via associated control decoders 904-1 through 904-m of each processing unit. The ID registers may be mapped within either memory or I/O space. It is noted, however, that each processing unit accesses its corresponding ID register 902 via the same address value. For example, the ID register 902 of each processing unit 202-1 through 202-m may be mapped at a memory location of 2000:H. Thus, if a designated processing core 204-1 through 204-m executes a read cycle to the memory location 2000:H, the value residing within the corresponding ID register 902 for that processing unit will be provided to the processing core. Each processing core would read a unique value in these situations.

Figure 13:
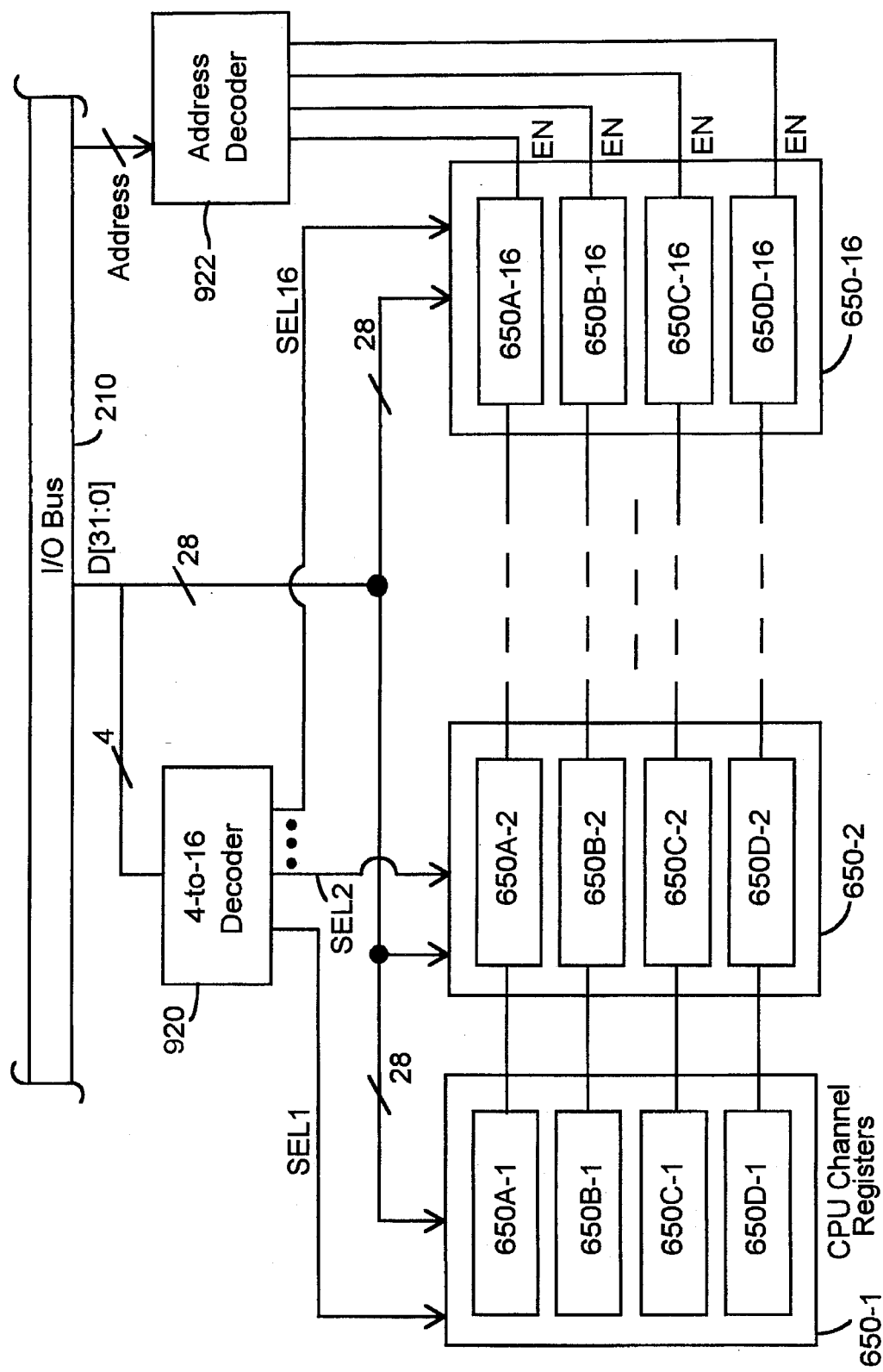
FIG. 13 is a block diagram that illustrates circuitry embodied within the central interrupt control unit.

FIG. 13 illustrates circuitry embodied within the central interrupt control unit 220 that allows data to be written (or read) from the respective CPU channel registers unit 650 of each CPU channel 606-1 through 606-m. In this illustration, it is assumed that a total of sixteen processing units may be connected within the system; however, it is understood that the circuitry may alternatively be configured to accommodate, for example, 256 unique processing units. FIG. 13 illustrates the CPU channel registers units 650-1 through 650-16 for the separate sixteen CPU channels. As stated previously, each CPU channel registers unit 650-1 through 650-16 includes a current task priority register 650A, a current interrupt ID register 650B, a processor ID register 650C, and a control register 650D. Each of these registers is coupled to receive (or provide) data from the data lines of CPU local bus 207. A 4-to-16 decoder circuit 920 is further coupled at its inputs to selected data lines of CPU local bus 207. The outputs of the 4-to-16 decoder circuit 920 are coupled to respective select lines of the CPU channel registers units 650-1 through 650-16. It is noted that each CPU channel registers unit 650-1 through 650-16 receives a separate select signal from 4-to-16 decoder circuit 920. An address decoder 922 is further coupled at its input to the address lines of I/O bus 210. Four latch enable lines are provided at an output of address decoder 922. An address decoder enable line is coupled to the latching enable inputs of each current task priority register 650A of the CPU channel registers units 650-1 through 650-16, and similarly address decoder enable lines are further connected to each current ID register 650B, each processor ID register 650C, and each control register 650D.

In accordance with the hardware implementation as depicted by FIGS. 12 and 13, when the CPU channel registers unit 650 of a designated CPU channel 606-1 through 606-m must be initialized or updated, the operating system programmer may structure the executing code such that the processor ID value within a designated ID register 902 is embedded as an index to direct attached data to the correct CPU channel registers units 650. For example, consider a situation in which the ID register 902 of each processing unit 202-1 through 202-m is mapped at a memory location 2000:H, and wherein the control register 650D of each CPU channel 606-1 through 606-m is mapped at an I/O address of 3000:H. If the operating system must update the configuration information within control register 650D for a particular processing unit, the programmer may first cause the designated processing unit to execute a memory read cycle to memory location 2000:H to read the value within the particular processing unit's ID register. The programmer may then invoke a command to append the ID value with the configuration data to be stored within the associated control register 650D. Subsequently, an I/O write command to address location 3000:H is executed to write the combined information (i.e., the configuration data along with the processor ID value). This I/O cycle is decoded by address decoder 922 which responsively causes the control registers 650D of each CPU channel registers unit 650-1 through 650-16 to be enabled. The processor ID value which is appended with the configuration data is then decoded by 4-to-16 decoder 920, which provides a select signal to a selected one of the CPU channel registers units 650-1 through 650-16. This causes the configuration data to be stored within only the selected and enabled registers. Configuration data is thereby provided to the designated CPU channel 606-1 through 606-m without requiring separate, dedicated address locations for the configuration registers of each CPU channel. It is noted that cycles for updating the registers of each CPU channel as well as read cycles are accomplished similarly. Exemplary code that carries out the required processor ID read operation as well as the code to append the ID to the configuration data and to write the configuration data to a designated CPU channel is as follows:

```
OS Code to Init a given CPU's control reg
    procedure init_channel
        id:= get mem(2000); - read ID register
        command:= id<< 28 or config data
        put io(3000), command
    end
```

Figure 14:
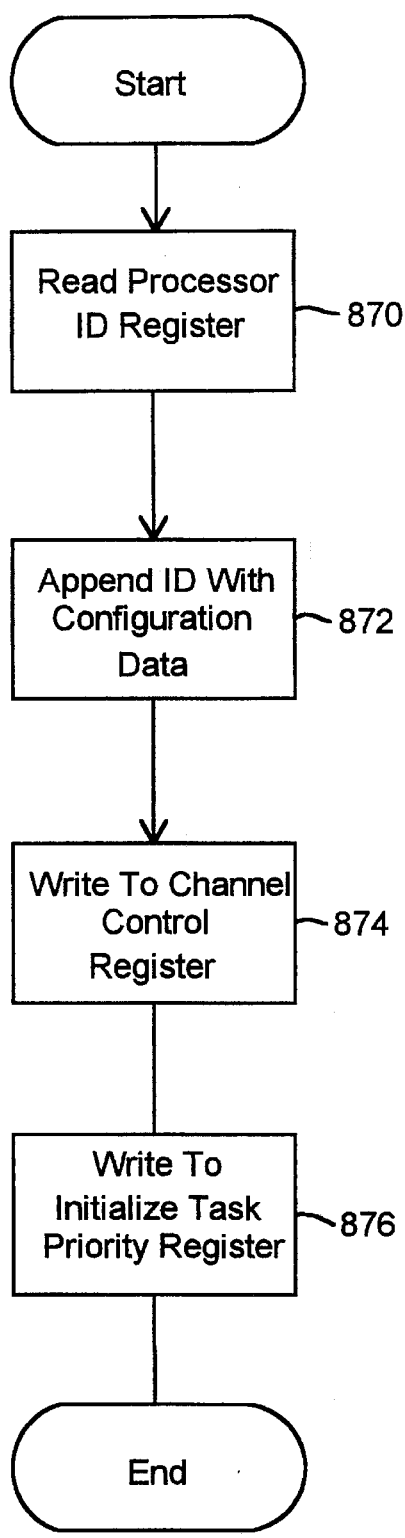
FIG. 14 is a flow diagram that depicts the initialization sequence for each slave processing unit.

Referring back to FIG. 11, after the boot processing unit has initialized the I/O channels in the central interrupt control unit 220 (the configuration registers of each I/O channel are mapped at dedicated locations separately from the configuration registers from the other I/O channels), the boot processing unit 202-1 must initialize the CPU channel 606-1. This is accomplished using the method described above in conjunction with FIGS. 12 and 13. Thus, during step 856, the processing unit 202-1 reads its corresponding ID register 902. During step 858, the processing unit 202 appends its ID register value to the desired configuration data which must be stored within a designated register of CPU channel registers unit 650. The processing unit 202-1 then executes a cycle to write the combined data to the selected register of CPU channel registers unit 650. It is noted that during this cycle, the 4-to-16 decoder 920 of FIG. 13 is employed to select the registers unit 650-1 of the CPU channel 906-1. Similar operations may be initiated to write additional initialization data into other registers of the CPU channel registers unit 650 of CPU channel 606-1. For one implementation, the current task priority register 650A and the control register 650D are written with initialization data by processing unit 202-1 during the initialization sequence. After the processing unit 202-1 has initialized its CPU channel 606-1, the processing unit 202-1 provides a command to the central interrupt control unit 220 which causes the central interrupt control unit 220 to release the remaining processing units 202-2 through 202-m from reset (step 862). Subsequently (step 864), the boot processing unit 202-1 waits for the slave initialization sequence as depicted in FIG. 14 to complete. This completes the initialization sequence.

FIG. 14 is a flow diagram that depicts the initialization sequence of each slave processing unit 202-2 through 202-m. When the master processing unit 202-1 causes the central interrupt control unit 220 to release the remaining processing units from reset, each processing unit 202-2 through 202-m reads its associated ID register 902-2 through 902-m respectively during step 870, appends the ID value with the configuration data to be stored within the control register 650D (step 872), and writes the combined data to the CPU channel registers unit 650 (step 874). The decoder circuit 920 of FIG. 13 is active during these cycles to select the appropriate CPU channel registers unit 650-1 through 650-16 in accordance with the processor ID identified during each particular cycle. Similar operations are repeated to initialize the task priority register 650A of each CPU channel (step 876). It is noted again that since a unique ID value residing within each of the ID registers 902-2 through 902-m is appended to the data written to each register of CPU channel registers unit 650, each processing unit 202-2 through 202-m effectuates its own CPU channel configuration.

Figure 15:
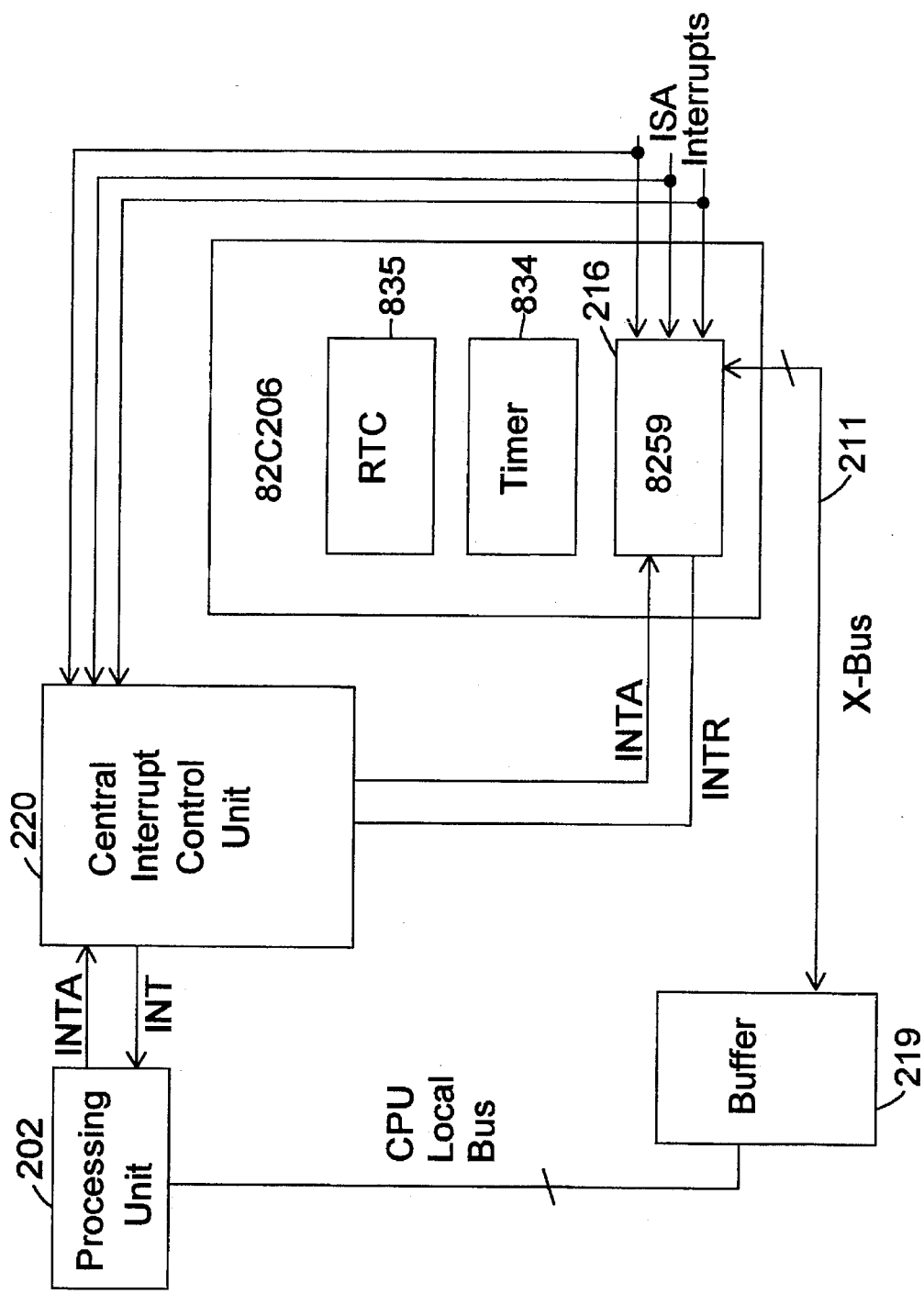
FIG. 15 is a block diagram which illustrates one of the processing units coupled to the central interrupt control unit.

Referring back again to FIGS. 2 and 4, it was stated previously that each designated interrupt channel 402-1 through 402-n may be programmed in what is referred to as the "8259" mode. This allows a programmable interrupt controller such as interrupt controller 216 to be connected to central interrupt control unit 220 when a particular interrupt channel is programmed in the 8259 mode (as indicated by the CM field of the associated control register 504A). During the 8259 mode of operation, the interrupt signal from the 8259 interrupt controller is passed through the central interrupt control unit 220 in accordance with its programmed priority, and the acknowledge signal from the receiving processing unit 202-1 through 202-m is passed back through the central interrupt control unit 220 to the interrupt controller 216. This is depicted within FIG. 15 which shows one of the processing units 202 coupled to the central interrupt control unit 220 and to a buffer 219. When an ISA interrupt is received at an interrupt input of the 8259 interrupt controller 216, the interrupts are passed through the central interrupt control unit 220 and, in accordance with the programmed priority level and other central control routing, is passed to a designated processing unit 202. When the designated processing unit 202 acknowledges the cycle, the interrupt acknowledge signal INTA is passed through central interrupt control unit 220 and is received at the interrupt acknowledge line of the 8259 interrupt controller 216. The interrupt controller 216 responsively drives the interrupt vector on an X-bus 211 (or any other bus), and the interrupt vector is passed to the processing unit 202 via a buffer 219. It is noted that buffer 219 may be embedded within bus bridge 208. Accordingly, for the 8259 cascade mode, the central interrupt control unit 220 does not directly respond to the interrupt acknowledge cycle of the receiving processing unit 202, and instead allows the vector information to be provided from the 8259 interrupt controller 216. It is further noted that accommodation of the 8259 cascading mode as described above advantageously allows the use of integrated interrupt sources such as a model 82C206 integrated circuit which includes a system timer 834 and a real time clock 835.

Figure 16:
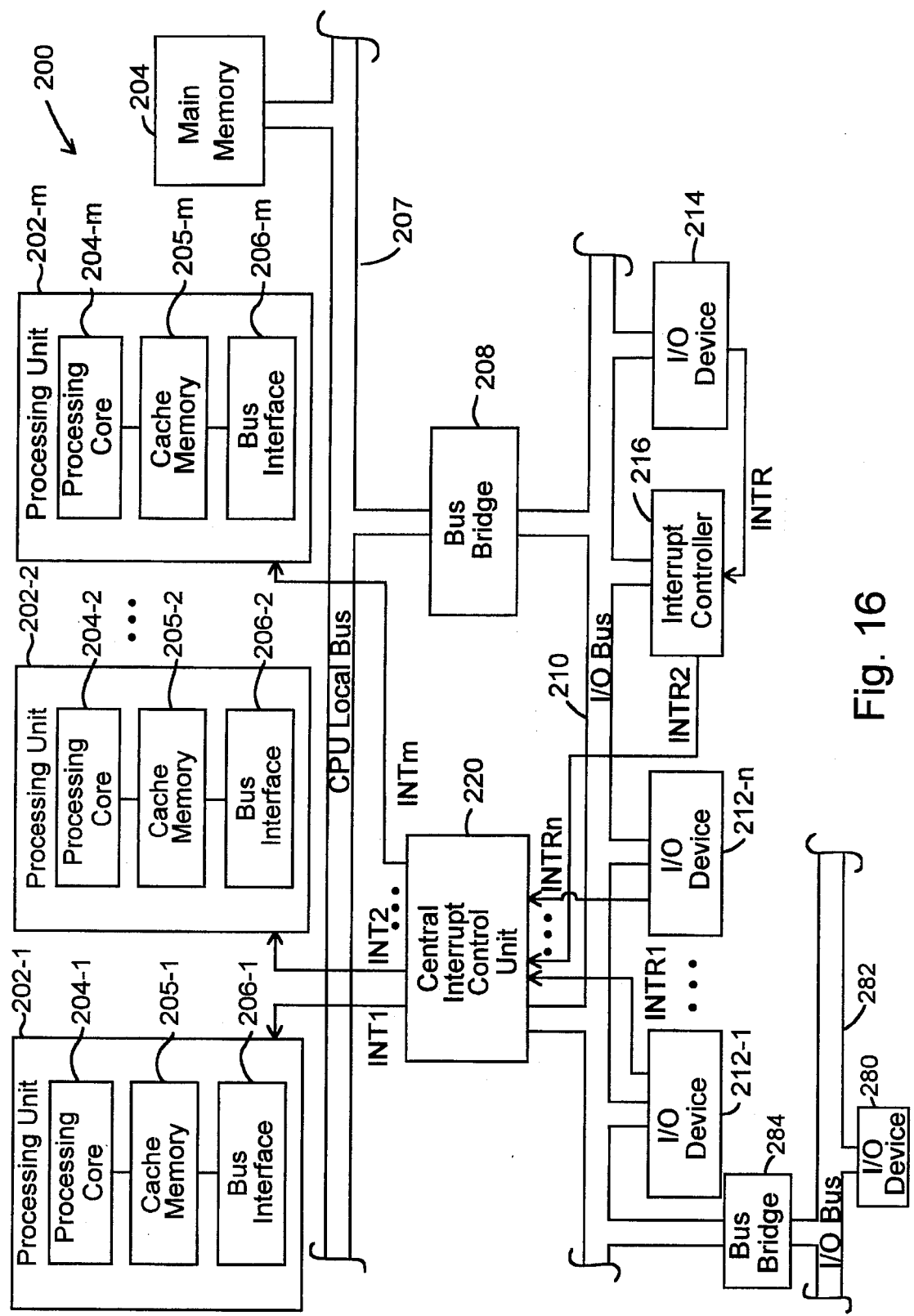
FIG. 16 is a block diagram of a multiprocessing system which accommodates specially defined interrupt cycles for initiating an interrupt.
Figure 17:
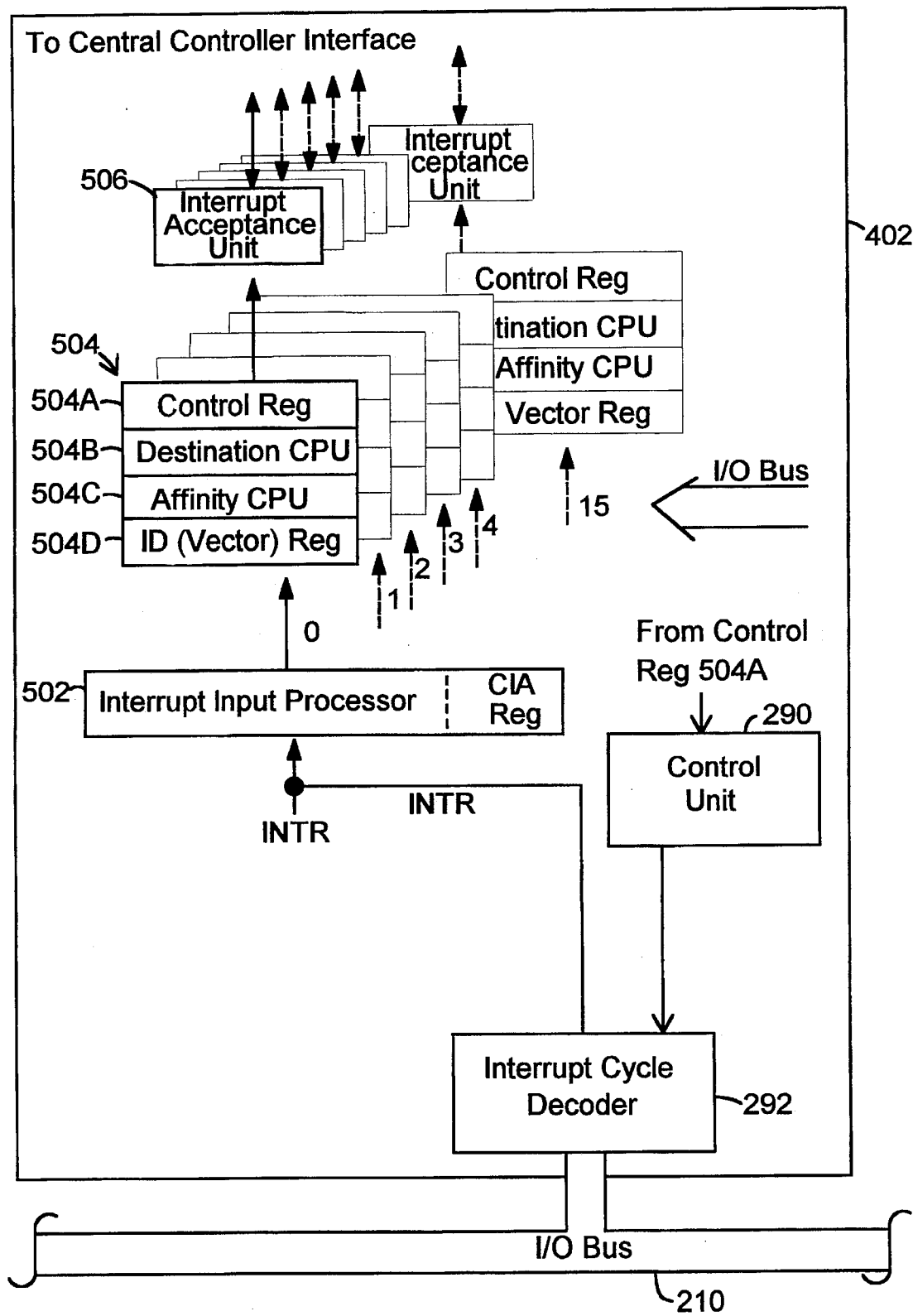
FIG. 17 is a block diagram that illustrates an interrupt channel including hardware configured to decode an interrupt cycle.

Referring back to FIG. 2, the multiprocessing system 200 may further be configured to allow the transfer of interrupt information across various interfaces using a specially defined cycle which is transferred across one or more of the buses incorporated within the system. This will be best understood with reference to FIG. 16. FIG. 16 is a block diagram of the multiprocessing system as generally represented in FIG. 2 with an additional I/O device 280 coupled to a second I/O bus 282. The second I/O bus 282 is coupled to I/O bus 210 via a bus bridge 284. The bus bridge 284 is illustrative of, for example, a docking station for coupling a portable computer as represented by I/O device 280 to the multiprocessing system. For the system of FIG. 16, the I/O device 280 may provide an interrupt signal to bus bridge 284. However, due to the cost and the possible unavailability of dedicated interrupt pins that coupled bus bridge 284 to central interrupt control unit 220, bus bridge 284 may not be configured to assert an interrupt signal at a dedicated line that is received by central interrupt control unit 220. Instead, in response to the assertion of an interrupt by I/O device 280, the bus bridge 284 may effectuate a specialized cycle, or a memory or I/O cycle to a dedicated memory location, to which a particular interrupt channel of central interrupt control unit 220 will respond. FIG. 17 illustrates an interrupt channel including hardware configured to decode an interrupt cycle as executed by bus bridge 284 and to assert a corresponding interrupt signal within the corresponding interrupt channel. As illustrated in FIG. 17, a control unit 290 is responsive to the CM field of control register 504A and correspondingly enables the interrupt cycle decoder 292 if the interrupt channel mode is designated as an I/O bus mode. When control unit 290 enables interrupt cycle decoder 292, the specialized interrupt cycle generated by bus bridge 284 is detected by interrupt cycle decoder 292, which correspondingly asserts an interrupt signal at the INTR input of interrupt input processor 502. It is noted that for situations in which I/O bus 210 is a PCI standard configuration bus, the special interrupt cycle may be defined by pre-specified coding of the cycle definition bits of the PCI bus. Alternatively, the special interrupt cycle may be defined as a cycle to a predetermined address in either the memory or I/O space of the system.

Figure 18:
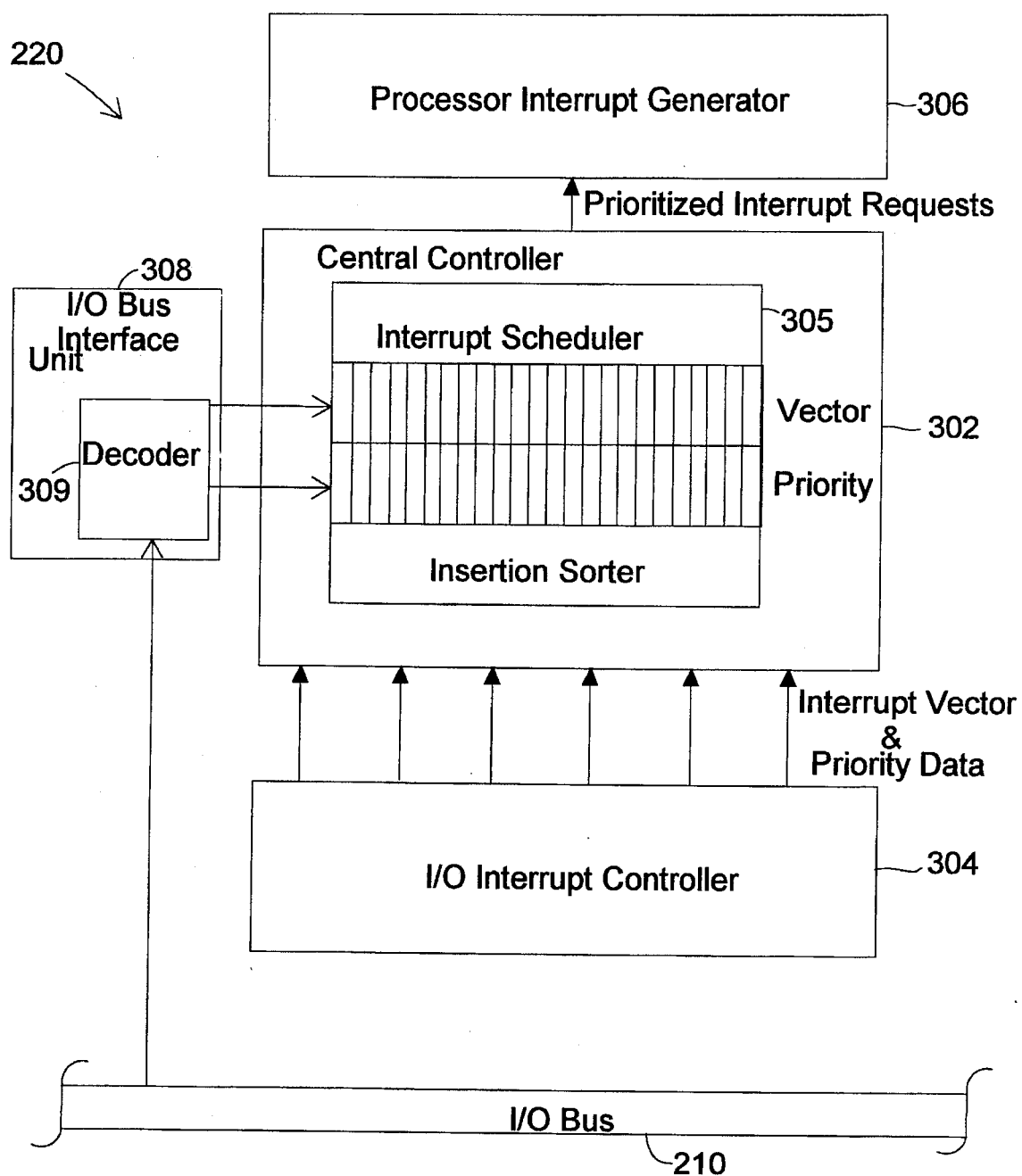
FIG. 18 is a block diagram that illustrates a portion of the central interrupt control unit including an internal portion of the central controller.

The prioritization of interrupts by central controller 302 is next considered. FIG. 18 is a block diagram that depicts a portion of central interrupt control unit 220 including I/O interrupt controller 304, central controller 302, and processor interrupt generator 306. Rather than automatically associating a particular interrupt with a fixed priority depending upon its interrupt vector, the central interrupt control unit 220 allows each interrupt to have a separate programmable interrupt vector and a separate priority. The priority is stored within the PL field of the associated control register 504A for the interrupt channel. As stated previously, upon system initialization, the vector for each interrupt channel is set. In addition, the priority level for the interrupt channel is also set. Once a particular interrupt request is accepted by the I/O interrupt controller 304, the interrupt vector and priority data is processed by an interrupt scheduler 305 of the central controller 302 which correspondingly provides the interrupt vector and priority data for each interrupt within a pending interrupt queue 652 (FIG. 10) of a designated CPU channel of the processor interrupt generator 306. The interrupts are provided to the various interrupt queues of the CPU channels in a prioritized manner based upon the priority level indicated by the interrupts control register as well as based upon the current task priorities of the available processing units. FIG. 18 illustrates a decoder unit 309 within the I/O bus interface unit 308 which allows separate programming of the vector information and priority information for each interrupt via designated I/O or memory cycles on I/O bus 210. For one simple configuration, the pending interrupt requests are provided to the interrupt queues of the CPU channels in their prioritized order.

Figure 19:
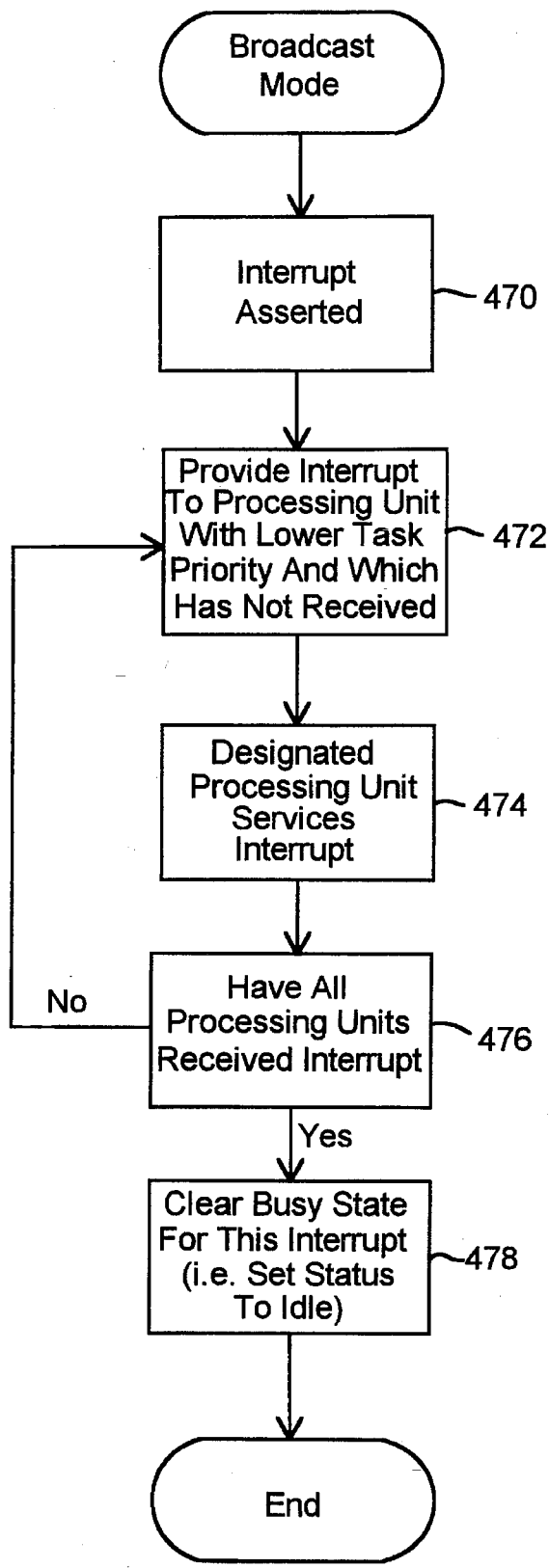
FIG. 19 is a flow diagram that illustrates the delivery of an interrupt during the broadcast mode.

Referring again to FIG. 2, it was stated previously that selected interrupts such as a timer tick interrupt may need to be provided in a broadcast fashion to each processing unit 202-1 through 202-m. If the delivery mode for a particular interrupt signal is designated as broadcast mode (i.e., DM field of the control register 504A for the interrupt), the central controller 302 operates in accordance with an autochaining technique as depicted in the flow diagram of FIG. 19. As illustrated in FIG. 19, if the interrupt request signal for an interrupt designated as broadcast is asserted as determined during step 470, the interrupt is provided to the processing unit 202-1 through 202-m that has the lowest current task priority level (as indicated by the current task priority register 650A for that CPU channel) during step 472. During step 474, the designated processing unit services the interrupt and returns an End Of Interrupt (EOI) command to the central controller 302. If all processing units 202-1 through 202-m have not yet received the interrupt (step 476), the interrupt is provided to the next processing unit 202-1 through 202-m which has not yet received this interrupt and which has the lowest current task priority value (of those remaining processing units that have not yet received the interrupt). This next processing unit then services the interrupt and returns an End Of Interrupt command to the central controller 302. This process repeats until each processing unit 202-1 through 202-m has serviced the interrupt. When all processing units have received and serviced the interrupt, the busy bit for the interrupt (i.e., the idle state of the ST field of the control register 504A for the interrupt channel) is cleared (step 478). It is understood that a similar autochaining procedure may be carried out if a designated set of processing units must receive a particular interrupt, rather than all the processing units. In accordance with the autochaining technique described above in which interrupts such as timer tick interrupts are provided to two or more of the processing units, the central controller 302 intelligently selectively passes the interrupt to the processing unit having the lowest current task priority level indicated. The interrupt is not passed to subsequent processing units until the prior processing unit has completed its service of the interrupt. As a result, bus contention is minimized and system performance is maximized by interrupting the processing units with the lowest relative current task priority values before interrupting processing units with high relative task priorities.

The central interrupt control unit 220 is further configured to prevent the occurrence of spurious interrupts. As stated previously, when a level triggered interrupt is being serviced by a designated processing unit, an I/O command is typically associated with the interrupt service routine that, when executed, causes the interrupt source to deassert the interrupt signal. Subsequently, an End Of Interrupt (EOI) command is executed to inform the central interrupt control unit 220 that the interrupt service has completed. A spurious interrupt may occur if a significant latency is introduced between the time at which the processing unit executes the I/O command (to cause the interrupt source to deassert the interrupt signal) and the time at which the interrupt signal is deasserted. Such a latency may occur, for example, if the I/O device resides on a remote bus via several bus interface units. If the interrupt source does not deassert the interrupt signal before the centralized interrupt controller responds to the End Of Interrupt command, the continued assertion of the interrupt may be detected by the central interrupt control unit 220, thus, causing the interrupt to be unintentionally re-initiated.

Figure 20:
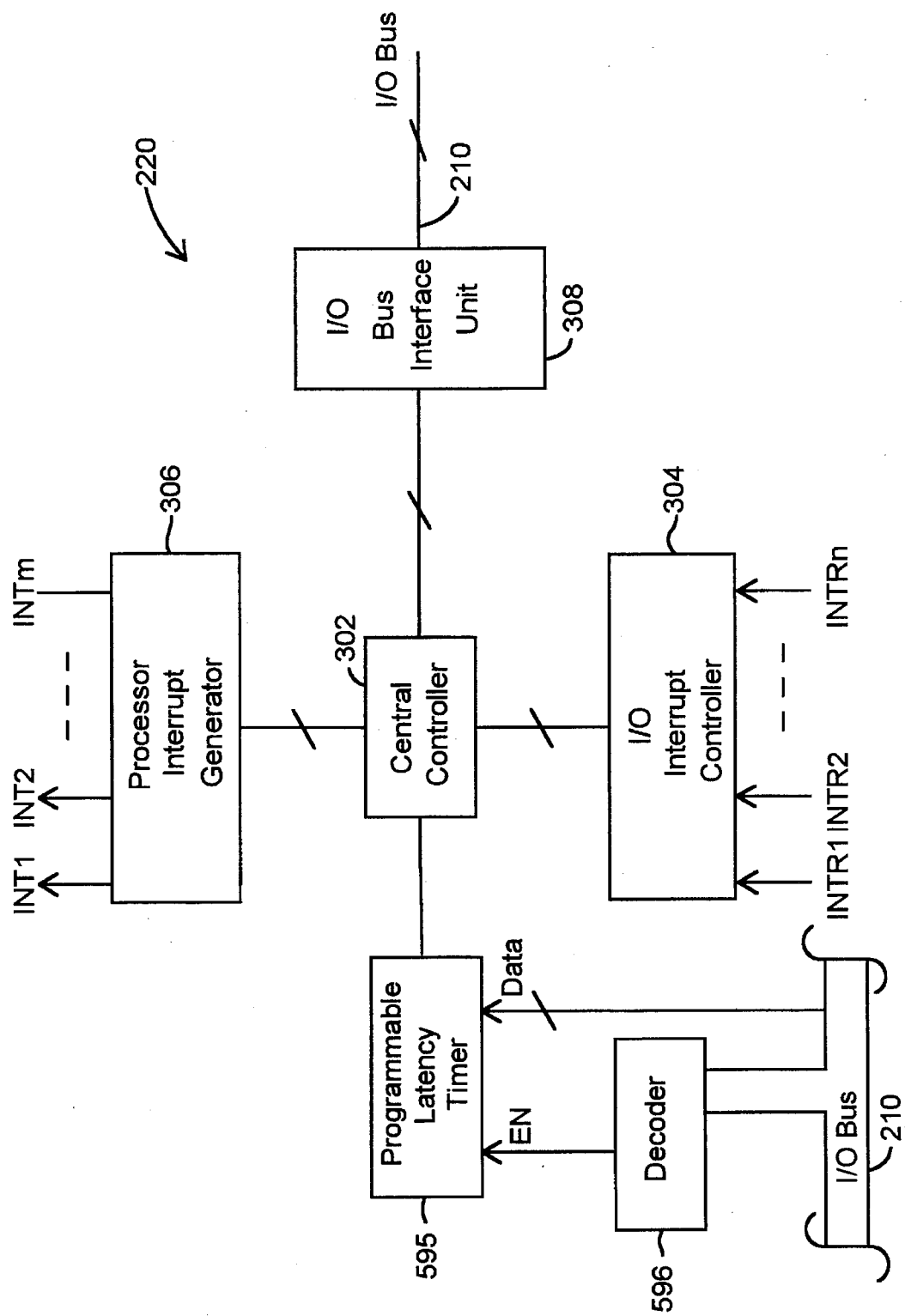
FIG. 20 is a block diagram of the central control unit including a programmable latency timer.

Referring to FIG. 20, the central control unit 220 is advantageously associated with a programmable latency timer 595 coupled to I/O bus 210 through a decoder unit 596. The programmable latency timer 595 may be programmed by a system user to set a programmable time delay between the time at which the central controller 302 receives an End Of Interrupt command and the time at which the central controller 302 resets the status (ST) field of the control register 504A of the particular interrupt channel. It will be appreciated that the I/O interrupt controller 304 is configured such that a designated interrupt signal is not monitored if the status indicates that the interrupt is either being serviced, has been dispatched from the central interface control unit 220 to a particular processing unit, or has been queued in the central controller 302. Once the central controller 302 resets the status to idle for a particular interrupt signal, the I/O interrupt controller 304 continues to monitor the particular interrupt signal for subsequent assertions. It is noted that since programmable timer 595 delays the resetting of the ST field of the control register for the particular interrupt channel, spurious interrupts may be prevented. It is further noted that the programmable timer 595 may be selectively enabled for each interrupt via the EOI field of that interrupt's channel control register 504A. It is also noted that decoder 596 may be embodied as an integral part of I/O bus interface unit 308.

Figure 21:
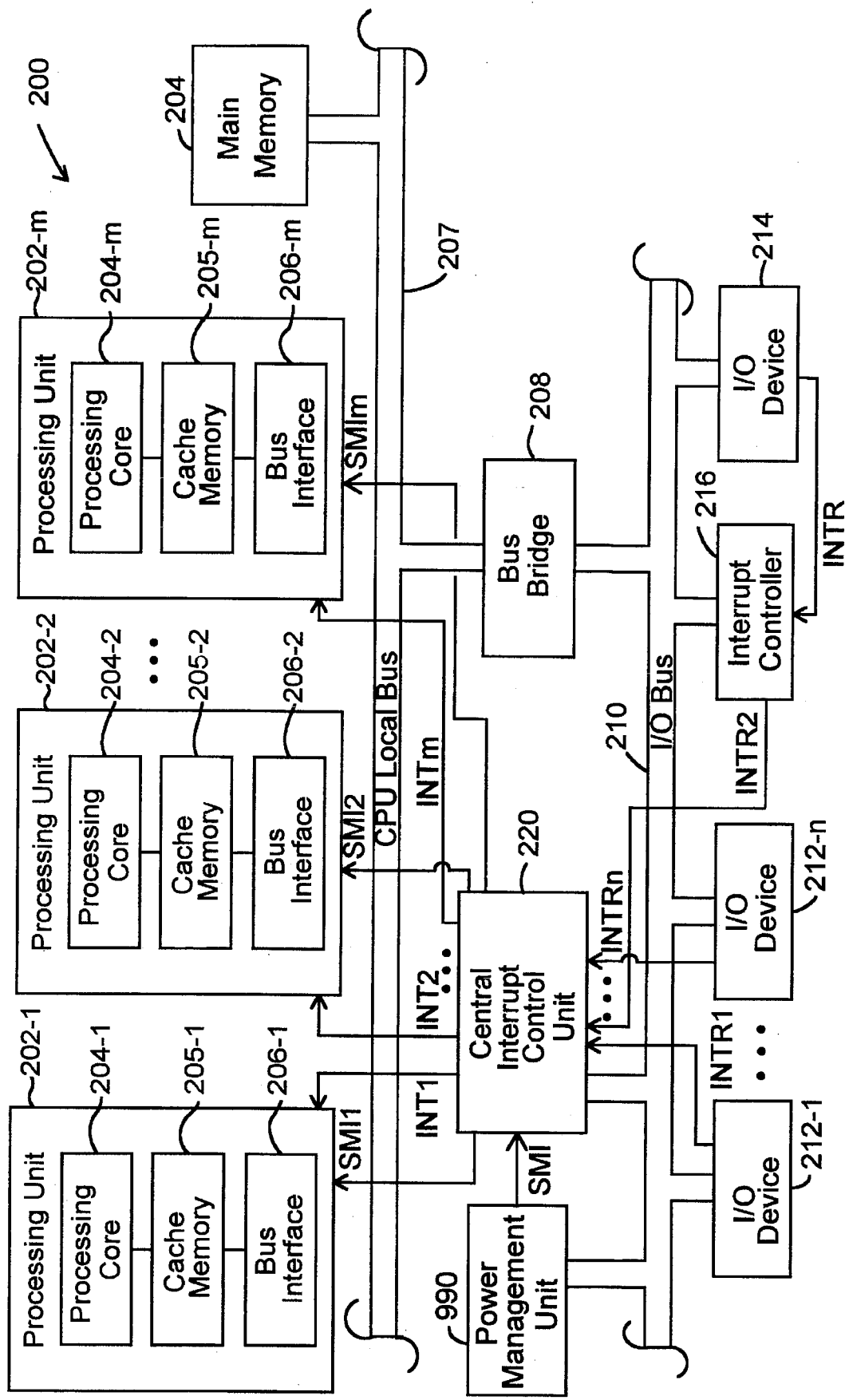
FIG. 21 is a block diagram of a symmetrical multiprocessing system including a power management unit capable of asserting a system management interrupt.
Figure 22:
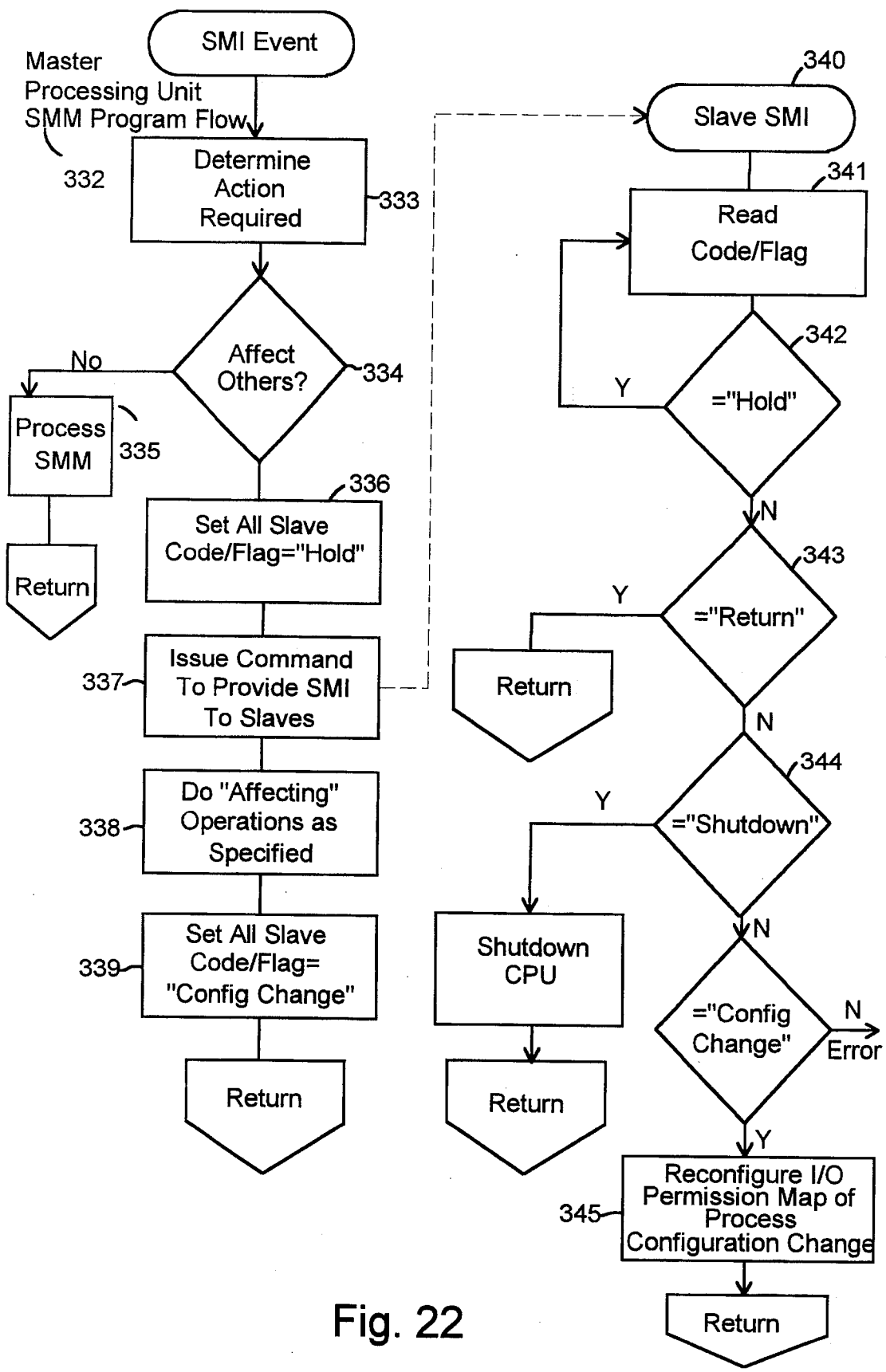
FIG. 22 is a flow diagram that depicts operation of the symmetrical multiprocessing system when a system management interrupt is asserted.

Referring finally to FIGS. 21 and 22, the integration of system management interrupts into the symmetrical multiprocessing system of FIG. 2 is next considered. As is generally known, system management interrupts are commonly used, for example, in the implementation of system power management. However, for a symmetrical multiprocessing system, SMI interrupts typically cannot be handled in the same way as normal interrupts and NMI (non-maskable interrupts) are handled. Accordingly, the central interrupt control unit 220 of FIG. 21 is configured to optimally deal with system management interrupts that may be received from a system management source such as a power management unit 990. The central controller 302 of central interrupt control unit 220 manages system management interrupts by designating one of the processing units 202-1 through 202-m as the master SMM (system management mode) handler. The master SMM processing unit may be designated via system configuration. All SMM interrupt requests (i.e., the SMI signal from power management unit 990) are routed to the master SMM processing unit. The remaining processing units 202-1 through 202-m are referred to as slave processing units. FIG. 22 is a flow diagram that illustrates the operation of the master SMM processing unit as well as the slave SMM processing units.

Having one processing unit in system management mode and the other processing units executing normal code could cause system problems, such as an active processing unit accessing a peripheral just turned off by the SMM master processing unit. When the master SMM processing unit determines that its actions will have an effect on the other processors in the system, the master processing unit issues a command that causes the central controller 302 to assert an SMI to all other CPUs in the system. A field of the control register 650D (or a separate register of CPU registers unit 650) for each CPU channel 606 is provided that, per processing unit, holds a SMM code/flag value for each slave SMM processing unit. Initially, this flag indicates "HOLD" to each slave SMM processing unit. Upon entry of SMM and seeing the HOLD code in that register, each slave SMM processing unit will pause and poll its corresponding SMM code/flag field until it changes. When the master SMM processing unit processes the requested actions for system management (powering down a peripheral, for example), it changes the status of the other processing units SMM code flags with a special command (i.e., note that normally one processing unit cannot affect other processing units channel registers), which will allow them to continue SMM code execution. It is noted that the central controller 302 is configured to allow the master processing unit to write the SMM code flags of the other processing units CPU channel registers during the system management mode. Possible flag values could be "RETURN", "CONFIG CHANGE", "SHUTDOWN", etc. The slave SMM processing units can then determine the best possible actions to take in order to respond correctly to the new code flag value. Note that the master SMM processing unit and slave SMM processing units can be sharing the same SMM code space. Therefore the SMM code must identify master/slave status, via software control.

Referring collectively to FIGS. 20 and 21, when power management unit 990 asserts the system management interrupt, the central controller 302 (FIG. 3) of central interrupt control unit 220 asserts the SMI input of processing unit 202-1, which is the designated SMM master for this system. This causes the processing unit 202-1 to begin execution of the SMM service routine during step 332. During step 333, the processing unit 202-1 determines the action required (in accordance with the specific SMM code provided by the system programmer), and determines whether the required actions may have an effect upon the other processing units in the system during step 334. If the requested action will not affect any other processing units, the SMI service routine is completed during step 335, and the processing unit 202-1 subsequently returns to normal operation.

If, on the other hand, the requested action during the system management service routine may have an effect with respect to the operation of the other processing units, the processing unit 202-1 causes the code/flag register within each of the other CPU channels to indicate that the other processing units should hold (step 336). It is noted that a code/flag register (or field) for each slave processing unit is embodied within the CPU channel registers unit 650 of each CPU channel 606. Subsequently, the processing unit 202-1 causes the central controller 302 to provide an SMI to each of the slave processing units 202-2 through 202-m during step 337. The processing unit 202-1 subsequently completes its requested system management mode operations (step 339), and causes the code/flag registers of the slave processing units 202-2 through 202-m to indicate that a change has occurred in the system configuration (step 339). The system management interrupt routine for the processing unit 202-1 then completes, and the processing unit 202-1 returns to normal operation.

When the central controller 302 asserts the SMI signals to the slave processing units 202-2 through 202-m, each of the processing units 202-2 through 202-m begins execution of the SMI service routine during step 340. During execution of the SMI service routine (step 341), each of the processing units 202-2 through 202-m identify themselves as slaves, and consequently read their respective code/flag registers using the CPU ID registers 902-2 through 902-m, respectively, in a manner as described previously for accessing the configuration registers 650 of each CPU channel. If the code/flag register indicates that the respective processing unit should hold, the processing unit effectively remains idle until the code register indicates some other status. For example, the code register of the processing units 202-2 through 202-m may indicate that the respective processing units should return to their normal execution with no further action required (step 343). Similarly, the code/flag register may instruct the respective processing unit to shut down (step 344). It is noted that the master processing unit 202-1 or the central controller 302 may have previously set the code/flag register of the particular processing unit to indicate "return" or "shutdown". If the code/flag register indicates that a configuration parameter within the system has changed (step 345), the I/O permission map for the respective processing units is reconfigured to reflect the system change. It is noted that the reconfiguration of the I/O permission map for each processing unit is accomplished in a conventional manner.

In accordance with the symmetrical multiprocessing system as described above, efficient management of system interrupts is achieved while maintaining broad compatibility. Interrupt management is attained by way of a centralized interrupt control unit. The interrupt control unit advantageously allows for the expansion of each interrupt pin by setting the interrupt control unit in a cascade mode. Furthermore, the central control unit is responsive to specialized interrupt cycles which allows I/O devices and/or bus bridge devices to cause initiation of an interrupt without requiring a dedicated interrupt line. The central interrupt control unit further allows each interrupt to be prioritized independently of its associated vector ID, and prevents the occurrence of spurious interrupts by providing a programmable latency timer which causes the central interrupt control unit to delay its response to End Of Interrupt (EOI) instructions. An auto-chaining technique is further implemented by the central interrupt control unit to sequentially provide broadcast interrupts to various processing units based on their current task priority values. Finally, the central interrupt control unit further handles system management interrupts (SMIs) from sources such as power management units and ensures proper system operation even if the requested system management function affects operations being carried by other processing units.

Numerous variations and modifications will become apparent to those skilled in the art once the above disclosure is fully appreciated. It is intended that the following claims be interpreted to embrace all such variations and modifications.

What is claimed is:

1. A multiprocessing computer system comprising:

a plurality of processing units;

a plurality of peripheral devices, wherein each of said peripheral devices is configured to generate a respective interrupt signal;

a plurality of interrupt channels coupled to said plurality of peripheral devices, wherein each interrupt channel is configured to detect an assertion of an interrupt of a corresponding peripheral device, and wherein each interrupt channel further includes a programmable storage unit for storing a vector and a priority value associated with said interrupt of said corresponding peripheral device;

a plurality of CPU channels coupled to said plurality of processing units, wherein each CPU channel is configured to receive interrupt information to control assertions of a corresponding processor interrupt, wherein said interrupt information includes said vector and priority value corresponding to each of several selected interrupts of said peripheral devices that have been asserted;

a central controller coupled to said plurality of interrupt channels and to said plurality of CPU channels, wherein said central controller is configured to route said interrupt information corresponding to said each of several interrupts that have been asserted from any of said plurality of interrupt channels to a designated CPU channel, and wherein said central controller is configured to prioritize several selected co-pending interrupts provided to said designated CPU channel in accordance with said priority values, whereby said designated processing unit is interrupted by a higher priority interrupt before being interrupted by a lower priority co-pending interrupt;

a status register coupled to said central controller configured to store information indicative of whether a particular interrupt signal is idle, wherein said central controller is configured to control the status of said status register according to interrupt signals dispatched to at least one of said plurality of processing units and an End Of Interrupt command executed by said at least one of said plurality of processing units; and a programmable latency timer coupled to said central controller, wherein said central controller is configured to use a value within said programmable latency timer to control a time at which said status register is updated in response to an End Of Interrupt command.

2. An interrupt controller comprising:

a plurality of interrupt input terminals configured to receive a plurality of interrupt signals;

a central controller coupled to said input terminals configured to prioritize said plurality of interrupt signals and configured to provide said interrupt signals to at least one processing unit;

an I/O interrupt controller coupled between said plurality of interrupt input terminals and said central controller, said I/O interrupt controller being configured to monitor a status of said plurality of interrupt signals, to selectively respond to an assertion of any of said plurality of interrupt signals and to provide an indication of said assertion to said central controller;

a storage unit coupled to said central controller configured to store information indicative of whether a particular interrupt signal is idle, wherein said central controller is configured to control a content of said storage unit according to interrupt signals dispatched to said processing unit and an End Of Interrupt command executed by said processing unit; and a programmable latency timer coupled to said central controller, wherein said central controller is configured to use a value within said programmable latency timer to control a time at which said storage unit is updated in response to an End Of Interrupt command, and wherein said latency timer is programmable through an I/O bus.

3. An interrupt controller as recited in claim 2 wherein said central controller is configured to reset a particular interrupt to an idle state a predetermined time after said End Of Interrupt command.

4. An interrupt controller as recited in claim 2 wherein said I/O interrupt controller is configured to monitor the status of an interrupt if said storage unit indicates that said interrupt is in an idle state.

5. An interrupt controller as recited in claim 2 further including a processor interrupt generator coupled to said central controller, said processor interrupt generator including a plurality of interrupt output terminals coupled to a plurality of processing units and configured to dispatch interrupt signals to said plurality of processing units.

6. An interrupt controller as recited in claim 2 further including a decoder coupled between an I/O bus and said programmable latency timer, said decoder being configured to detect an End Of Interrupt command and of enabling said programmable latency timer in response to the detection of said End Of Interrupt command.

7. An interrupt controller as recited in claim 2, wherein said storage unit is a status register.

* * * * *